United States Patent
Moore et al.

(10) Patent No.: US 12,395,481 B2
(45) Date of Patent: Aug. 19, 2025

(54) METHODS AND SYSTEMS FOR CERTIFICATE FILTERING

(71) Applicant: Centripetal Networks, LLC, Portsmouth, NH (US)

(72) Inventors: Sean Moore, Hollis, NH (US); David K. Ahn, Winston-Salem, NC (US)

(73) Assignee: Centripetal Networks, LLC, Portsmouth, NH (US)

(*) Notice: Subject to any disclaimer, the term of this patent is extended or adjusted under 35 U.S.C. 154(b) by 0 days.

(21) Appl. No.: 17/180,932

(22) Filed: Feb. 22, 2021

(65) Prior Publication Data

US 2021/0266310 A1 Aug. 26, 2021

Related U.S. Application Data

(63) Continuation of application No. 16/293,087, filed on Mar. 5, 2019, now Pat. No. 10,931,661.

(51) Int. Cl.
  *H04L 9/00* (2022.01)
  *H04L 9/40* (2022.01)

(52) U.S. Cl.
  CPC ...... *H04L 63/0823* (2013.01); *H04L 63/0884* (2013.01); *H04L 63/0892* (2013.01); *H04L 63/101* (2013.01)

(58) Field of Classification Search
  CPC ............. H04L 63/0823; H04L 63/0884; H04L 63/0892; H04L 63/101; H04L 63/0281; H04L 63/0227; H04W 12/67
  See application file for complete search history.

(56) References Cited

U.S. PATENT DOCUMENTS

| | | | |
|---|---|---|---|
| 7,568,095 B2 | 7/2009 | Thornton et al. | |
| 8,161,547 B1 | 4/2012 | Jennings et al. | |
| 8,286,239 B1* | 10/2012 | Sutton | H04L 63/126 726/22 |
| 8,327,441 B2 | 12/2012 | Kumar et al. | |
| 8,443,434 B1 | 5/2013 | Zuk | |
| 8,683,052 B1 | 3/2014 | Brinskelle | |
| 8,726,379 B1 | 5/2014 | Stiansen et al. | |
| 9,166,999 B1 | 10/2015 | Kulkarni et al. | |
| 9,866,576 B2 | 1/2018 | Ahn et al. | |
| 9,917,856 B2 | 3/2018 | Ahn et al. | |
| 10,708,256 B1* | 7/2020 | Kane-Parry | H04L 63/0823 |
| 11,200,324 B1* | 12/2021 | Manral | G06F 21/629 |
| 2009/0064332 A1 | 3/2009 | Porras et al. | |

(Continued)

OTHER PUBLICATIONS

Alrawi, O., et al., "Chains of Distrust: Towards Understanding Certificates Used for Signing Malicious Applications", International World Wide Web Conference, Apr. 11-15, 2016, Montreal, Quebec, Canada, retrieved from <https://alrawi.github.io/static/papers/malcert.pdf>, 6 pages.

(Continued)

*Primary Examiner* — Kevin Ayala
(74) *Attorney, Agent, or Firm* — Banner & Witcoff, Ltd.

(57) ABSTRACT

SSL/TLS certificate filtering devices, systems and processes may filter packets based on risk associated with each packet. A risk score may be determined for each packet based on associated threats and risks. Risk scores may be determined based on certificates, certificate authorities, and/or end users associated with each packet. The certificates may be scored and/or categorized by threats and risk.

33 Claims, 12 Drawing Sheets

(56) References Cited

U.S. PATENT DOCUMENTS

| | | | | |
|---|---|---|---|---|
| 2012/0227109 | A1* | 9/2012 | Dimuro | A61Q 11/00 |
| | | | | 726/22 |
| 2012/0290829 | A1 | 11/2012 | Altman | |
| 2013/0312054 | A1 | 11/2013 | Wang et al. | |
| 2014/0310396 | A1 | 10/2014 | Christodorescu et al. | |
| 2015/0052345 | A1 | 2/2015 | Martini | |
| 2016/0267408 | A1 | 9/2016 | Singh et al. | |
| 2016/0277193 | A1* | 9/2016 | Sabin | H04L 9/321 |
| 2016/0308894 | A1 | 10/2016 | Ahn et al. | |
| 2016/0330236 | A1* | 11/2016 | Reddy | H04L 63/1416 |
| 2016/0337127 | A1 | 11/2016 | Schultz et al. | |
| 2016/0373433 | A1* | 12/2016 | Rivers | H04L 9/3265 |
| 2017/0005805 | A1 | 1/2017 | Wang et al. | |
| 2017/0012967 | A1* | 1/2017 | Holloway | H04L 63/0823 |
| 2017/0264597 | A1* | 9/2017 | Pizot | H04L 67/02 |
| 2018/0124110 | A1 | 5/2018 | Hunt et al. | |
| 2019/0251251 | A1* | 8/2019 | Carson | G06F 21/51 |
| 2020/0067944 | A1* | 2/2020 | Dave | H04W 12/66 |

OTHER PUBLICATIONS

Cooper, D., et al, "RFC 5280—Internet X.509 Public Key Infrastructure Certificate and Certificate Revocation List (CRL) Profile," Network Working Group, Standards Track, May 2008, 152 pages.

Eastlake, D., "Transport Layer Security (TLS) Extensions: Extension Definitions," Internet Engineering Task Force (IETF)—Standards Track, ISSN: 2070-1721, Huawei, Jan. 2011, 25 pages.

Felt, Adrienne Porter, et al., "Improving SSL Warnings: Comprehension and Adherence," CHI 2015, Apr. 18-23, 2015, Seoul, Republic of South Korea, retrieved from <http://research.google.com/pubs/pub43265.html>, 10 pages.

Liu, Y., et al., "An End-to-End Measurement of Certificate Revocation in the Web's PKI," IMC '15 Proceedings of the 2015 ACM Conference on Internet Measurement Conference, Oct. 28-30, 2015, retrieved from <https://www.cs.umd.edu/~dml/papers/revocations_imc15.pdf>, 14 pages.

Proofpoint, "Emerging Threat Intelligence—Cyber Threat Solutions," Copyright 2018, retrieved Feb. 22, 2019, from <https://www.proofpoint.com/us/solutions/products/threat-intelligence>, 6 pages.

Shbair, et al., "Efficiently Bypassing SNI-Based HTTPS Filtering", 2015 IFIP/IEEE International Symposium on Integrated Network Management (IM), Nov. 2015, pp. 990-995.

Langley, Adam, "Public Key Pinning", imperialviolet.org, May 4, 2011.

Georgiev, Martin, et al., "The Most Dangerous Code in the World: Validating SSL Certificates in Non-Browser Software", CCS '12 Proceedings of the 2012 ACM Conference on Computer and Communications Security, Oct. 2012, pp. 38-49.

Kankowski, Peter, "Beware of Unverified TLS Certificates in PHP & Python", retrieved from https://blog.sucuri.net/2016/03/beware-unverified-tls-certificates-php-python.html, Mar. 31, 2016.

Jun. 27, 2019 (US) Non-Final Office Action—U.S. Appl. No. 16/293,087.

Apr. 2, 2020, International Search Report of PCT/US2020/015329.

U.S. Appl. No. 16/293,087, filed Mar. 5, 2019.

Sep. 2009, Scarfone, K.; Hoffman, P.; Guidelines on Firewalls and Firewall Policy, Recommendations of the National Institute of Standards and Technology.

2014, Sourcefire SSL Appliance Administration & Deployment Guide for SSL1500, SSL2000, and SSL8200, Software Version 3.6, Cisco.

2013, User Guide for ASA CX and Cisco Prime Security Manager 9.1, Cisco.

Jul. 14, 2010, Kirk, A.: New Rule Categories, VRT, URL: <http://vrt-blog.snort.org/2010/07/new-rule-categories.html>, Archived in <http://www.archive.org> on Jan. 17, 2011.

Mar. 25, 2011, Snort Users Manual 2.9.0, The Snort Project.

Mar. 7, 2023, Interim Statement in the Opposition Proceedings against DE Utility Model No. 20 2016 008 885.9.

Feb. 3, 2022, Request for Cancellation of DE Utility Model 20 2016 008 885.9.

Mar. 8, 2022, Response to the Request for Cancellation of DE Utility Model 20 2016 008 885.9.

* cited by examiner

METHODS AND SYSTEMS FOR CERTIFICATE FILTERING

CROSS-REFERENCE TO RELATED APPLICATIONS

This application is a continuation of U.S. Ser. No. 16/293,087, filed on Mar. 5, 2019 and entitled "Methods and Systems for Certificate Filtering," which issued as U.S. Pat. No. 10,931,661 on Feb. 23, 2021, the entirety of which is hereby incorporated herein by reference.

FIELD

Aspects described herein generally relate to computer hardware and software and network security. In particular, one or more aspects of the disclosure generally relate to computer hardware and software for filtering communications based on certificates, certificate authorities, and end users associated with packets.

BACKGROUND

Network security is becoming increasingly important as the information age continues to unfold. A connection may be secured by encrypting data to protect the data from being exposed to third parties. In Transmission Control Protocol/Internet Protocol (TCP/IP) networks, in-transit communications between endpoints may be secured by using the Transport Layer Security (TLS) protocol, or by using TLS's predecessor, the Secure Sockets Layer (SSL) protocol. TLS provides for privacy, authentication, and integrity of communications. TLS secures communications by using X.509 certificates. These X.509 certificates are often issued by certificate authority (CA) organizations. Often, TLS is used to secure client-server communications, wherein the server provides a certificate that may be used to securely establish session keys. The client and the server use the session keys to encrypt and decrypt data sent through the TLS tunnel. For example, the Hypertext Transfer Protocol Secure (HTTPS) protocol that is commonly used to secure web communications consists of Hypertext Transfer Protocol (HTTP) communications encrypted by TLS or SSL. There are other protocols that use X.509 certificates to secure communications, such as the Datagram Transport Layer Security (DTLS), Quick UDP Internet Connections (QUIC), and the draft Hypertext Transport Protocol version 3 (HTTP/3), and these protocols may be used by a variety of applications including web browsers and servers, virtual private network (VPN) software, and software packaging and delivery systems.

Regarding security risks of the SSL/TLS protocols themselves, older versions of the protocols, such as SSL v2, SSL v3, and TLS 1.0, have been deprecated by standards organizations, e.g. IETF, because of known security vulnerabilities. There are fewer known security vulnerabilities with later versions of TLS. But there remain many security risks associated with SSL/TLS usage that may be exploited by malicious actors. Many of these risks are sourced by the dependency on humans to properly administer SSL/TLS usage and the associated certificates. For example, web site administrators may fail to keep up with version updates and security patches that protect certificates; CA organizations may be compromised, and therefore their issued certificates may be compromised; HTTPS endpoints and associated applications (e.g., web browsers) may not fully employ security risk reduction measures related to certificates; human end users may engage in risky behaviors, such as ignoring security risk warnings related to certificates; and so on. The present disclosure provides methods to mitigate these certificate-related security risks and thereby improve the security of SSL/TLS communications, as follows.

Currently, certificates and certificate authorities (CAs) may be analyzed for some security risks by a web browser or other applications hosted by endpoints, which may take actions to reduce risk; however, risks associated with the behaviors of end-users typically are not analyzed. An end user may refer to an entity operating endpoint-hosted applications (e.g., web browsers) that use SSL/TLS communications, and may be identified by endpoint addresses, Uniform Resource Names (URNs), directory names, etc. (e.g., via Lightweight Directory Access Protocol (LDAP)). An end user may also be identified by a user or endpoint certificate that is associated with that user or endpoint.

Browsers typically use a simple binary scale for measuring certificate risk. That is, certificates are considered either risk-free or invalid. No risk is associated with an issuing CA. Rather, browsers by default consider most CAs to be trustworthy/risk-free. Furthermore, when browsers cannot validate certificates, they may warn the human users of the security issue, but then give the human users the option of proceeding with the communications anyway. Users frequently opt to continue with the session, despite the risk indicated to the user. This process effectively neutralizes any benefits of the security analysis. These types of end-user behavioral risks typically are not identified and collected by browsers or proxies, and therefore not applied to further securing the network.

Worse, web browsers, and especially mobile browsers, often do not perform some basic security operations, such as checking certificates' revocation or expiration status, and/or not enforcing the security policies. These risky browser and human behaviors are well known to adversarial entities and may be readily exploited. Thus, as with many other types of cyber attacks, social engineering is an effective attack vector. Cybercriminals often move quickly to exploit these security holes.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

In view of the foregoing problems, moving some certificate and user related cybersecurity functions from endpoint browsers to a packet-filtering device at a secured network's perimeter may improve the effectiveness, quality, and value of cybersecurity. A properly configured packet-filtering device can apply certain certificate-related intelligence to the packets composing communications that may be secured by certificates. Further, the integration of these certificate-related cybersecurity functions with other threat intelligence applications and services may further improve network security afforded by packet filtering.

Aspects of this disclosure relate to filtering network data transfers. In some variations, multiple packets may be received. A determination may be made that a portion of the packets has associated values corresponding to a packet filtering rule. Responsive to such a determination, a function specified by the packet filtering rule may be applied to the portion of packets having the values corresponding to the packet filtering rule. A packet filtering device may apply rules based on certificates and associated information used to establish and secure SSL/TLS tunnels.

An SSL/TLS certificate filtering process may use at least one of three new types of threat indicators. The certificates themselves may be scored and/or categorized by threat risk. The certificate authorities (CAs) that issue certificates may be scored and/or categorized by trust risk. In addition, the end-users, including humans and machine/robotic systems, that may operate certificate-secured sessions (e.g., HTTPS sessions with web sites), may be scored and/or categorized by behavioral risk. Certificates, CAs, and end users with non-zero risk scores may be translated into threat indicators that are suitable for packet filtering. For example, a threat indicator associated with a certificate may be a particular pairing of the certificate's certificate authority/issuer name and a serial number, which may be observed by a properly configured packet filtering device. These indicators may be used in combination with other indicators, that the combination of those indicators may be scored and/or categorized by trust risk.

The packet filtering device may obtain or determine scaled risk scores that may be associated with at least one of a plurality of types of indicators. The scaled scores may be associated with a plurality of indicators, including Internet Protocol (IP) address, a 5-tuple, a domain name or fully qualified domain name (FQDN), and a Uniform Resource Identifier (URI), a Certificate, a Certificate Authority (CA), and an end-user (identified by, for example, an endpoint address or identity). A 5-tuple refers to a set of five different values that comprise a TCP/IP connection, and may include a source IP address, a source port number, a destination IP address, a destination port number, and a protocol in use. A 5-tuple indicator may identify an endpoint of a threat based on a subset of the five different values (e.g. a 2-tuple, a 3-tuple or an N-tuple). Each of the indicators may be associated with a risk value. Each risk value may be scaled. Alternatively, certain indicators may be associated with a binary trust scale.

At the time that an SSL/TLS-secured communication is occurring, it may be difficult or impractical to determine or estimate the actual scaled risk associated with it. Currently, binary risk values (e.g. indicating no risk or all risk) are typically used when assessing risks of certificate-related communications. Correspondingly, no-risk communications are typically allowed to proceed, and all-risk communications are typically blocked. This may be problematic in the case of false positives, when a legitimate (business) communication is inadvertently blocked, or in the case of false negatives, when an attack communication is allowed. In practice, blocking legitimate business communications is considered unacceptable, whereas inadvertently allowing an attack communication is considered undesirable but necessary if it ensures that legitimate communications are not inadvertently blocked. As such, the packet filtering device may determine a continuum or spectrum of risk values. The packet filtering device may determine risk values that may be used to report the risk associated with an SSL/TLS-secured communication. The determined risk, including a plurality of scaled risk scores associated with the determined risk, may be sent by the packet filtering device to a server that collects risks received from a plurality of resources.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
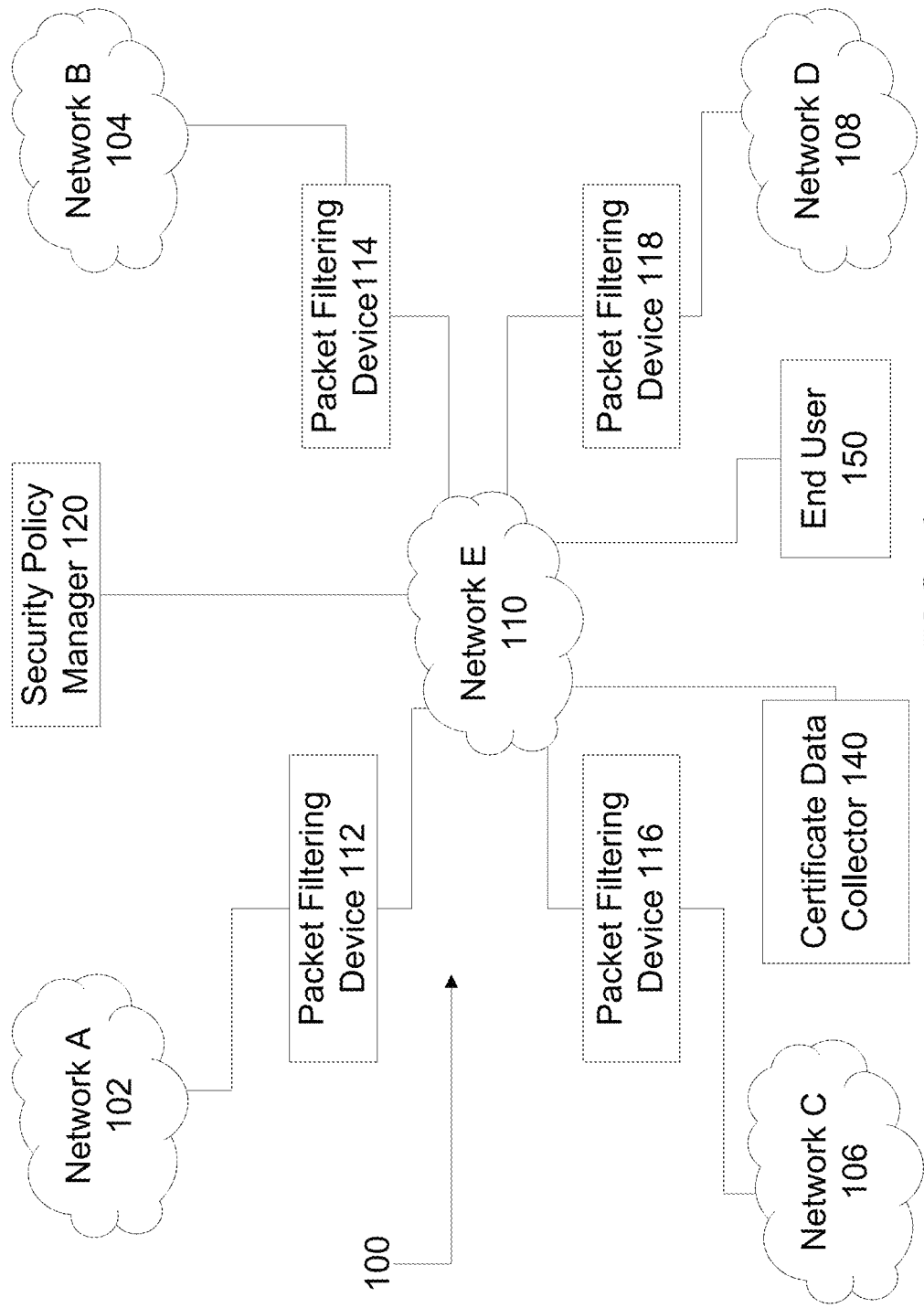
FIG. 1 illustrates an exemplary network environment in which one or more aspects of the disclosure may be implemented.

FIG. 1 illustrates an exemplary network environment in which one or more aspects of the disclosure may be implemented. Referring to FIG. 1, network environment 100 may include networks A-E 102, 104, 106, 108, and 110. One or more networks within network environment 100 may be a Local Area Network (LAN) or a Wide Area Network (WAN). Such a LAN or WAN may be associated, for example, with an organization (e.g., a company, university, enterprise, or government agency). For example, networks A-D 102, 104, 106, and 108 may be LANs, any combination of which may be associated with one or more organizations. One or more networks within network environment 100 may interface with one or more other networks within network environment 100. For example, network environment 100 may include a WAN that interfaces one or more LANs within network environment 100 or network environment 100 may include one or more Internet Service Providers (ISPs) that interface one or more LANs or WANs within network environment 100 via the Internet. For example, network E 110 may comprise the Internet and may interface networks A-D 102, 104, 106, and 108.

As used herein, a packet security device or packet filtering device 112 (FIG. 2) may include any computing device configured to receive packets and may perform one or more packet transformation functions on the packets. The packet transformation functions may improve the security of the system by preventing packets from continuing to their intended destinations or providing monitoring of suspicious packets or packet flows. The packet filtering devices may be located at an enterprise network's security boundary (which is often at or near the Internet access points, which may be physically on-premises, virtually in the cloud, or both/hybrid). The packet filtering device may filter packets by performing in-transit/in-network certificate and CA filtering, such that the packets may be filtered at the frame/packet level (L2/L3) based on certificate and CA data. The packet filtering device may perform certificate and certificate authority filtering directly on packets as they are traversing the network/crossing the protected network's security boundary (which may be physical, virtual, logical, software-defined, etc.).

For each packet or collection of packets containing a certificate and its chain of trust, the packet filtering device may verify the certificate's digital signature, check a certificate's expiration date, compare/match a certificate's Subject: Common Name value or subjectAltName values with a domain name originally requested by the browser, check if the certificate has been revoked by the issuing CA, check if the certificate is self-signed, and validate the certificate's chain of trust.

The packet filtering device may download certificate threat intelligence data. The certificate threat intelligence data may include certificate revocation information. Certificate revocation information may be downloaded by the packet filtering device, with other threat intelligence data. The threat intelligence data may also include other certificate and certificate authority intelligence information, in addition to certificate revocation status. The threat intelligence data may include certificate logs used with Certificate Transparency. The packet filtering device may perform packet filtering at the frame/packet level (L2/L3) based on a certificate revocation check data as certificate-containing packets are in-transit. The packet filtering device 112 may perform the certificate revocation check using only information stored by the packet filtering device. That is, the packet filtering device may perform certificate revocation list (CRL) filtering and certificate rule filtering based on information that has been generated by or downloaded to the packet filtering device, without additional network queries to a certificate authority or other certificate data provider. Certificate threat intelligence, including a CRL or plurality of CRLs may be locally stored in memory of the packet filtering device 112. The packet filtering device 112 may store the certificate threat intelligence data in a database. The packet filtering device 112 may search the locally stored the certificate threat intelligence data for determined certificate data associated with each packet.

A packet security device 112 may be configured to perform one or more additional functions as described herein. For example, the packet security device 112 may be configured to process packets in keeping with U.S. Patent Application Pub. No. 2017/0187733, which is hereby incorporated by reference. The packet security device 112 may be configured to filter SSL/TLS-tunneled communications (e.g. HTTPS) using Indicators of Compromise (IoCs), such as an associated Fully Qualified Domain Name (FQDN).

A packet security device 112 may filter packets based on FQDN indicators and other data that may appear in fields contained in messages that are transmitted during SSL/TLS sessions' setup/handshaking. These fields may include (1) a Server Name Indicator (SNI) field contained in the handshake's ClientHello message; (2) a Subject: Common Name field in the server's certificate contained in the Certificate message; and (3) the subjectAltName field, also in the server's certificate contained in the Certificate message, in keeping with RFC 5280. For example, a server identity may be determined in keeping with RFC 2818. Certificate filtering may include steps in keeping with RFC 5280. The packet filtering device 112 may perform session state tracking and flow tracking, and may associate and filter packets associated with the same packet flow based on the same field. Session state tracking may allow the packet filtering device 112 to track and store session data related to an end user 150, and may associate threat risks with each packet of the same session. Similarly, the packet filtering device 112 may track and monitor packet flows and may associate threat risks with each packet of the same flow. When session setup messages are being transmitted for an SSL/TLS handshake, packet filtering device 112 may check message fields. For example, packet filtering device 112 may check that the Server Name Indicator (SNI) value included in the ClientHello message matches the Subject: CN value or subjectAltName values included in the server certificate. If the values do not match, the packet filtering device 112 may terminate the session.

A security policy management server 120 (FIG. 1) may include any computing device configured to communicate a security policy data to a packet filtering device. A security policy management server 120 may further be configured to perform one or more additional functions as described herein, including gathering certificate intelligence and CA intelligence, and generating associated intelligence-derived rules for distribution to packet filtering devices. As used herein, a security policy includes any rule, message, instruction, file, data structure, or the like that specifies criteria corresponding to one or more packets and identifies a packet transformation function to be performed on packets corresponding to the specified criteria. A security policy may further specify one or more additional parameters as described herein. A security policy may be updated based on changes in rules or changes in system preferences.

Network environment 100 may include one or more packet filtering devices 112, 114, 116, and 118 and one or more security policy management servers 120. For example, network environment 100 may include a security policy management server 120 and a plurality of packet filtering devices, which may be implemented as packet security gateways, which sit at network boundaries between a trusted portion of a network (e.g. a private network) and an untrusted portion of a network (e.g. the Internet). One or more security policy management servers may be associated with a protected network. For example, networks A-D 102, 104, 106, and 108 may each be distinct LANs associated with a common organization and may each form part of a protected network associated with security policy management server 120. A packet filtering device may be provided at each boundary between a protected network and an unprotected network. For example, packet filtering device 112 may be located at the boundary between protected network A 102 and network E 110. Similarly, packet filtering device 114 may be located at the boundary between protected network B 104 and network E 110; packet filtering device 116 may be located at the boundary between protected network C 106 and network E 110; and packet filtering device 118 may be located at the boundary between protected network D 108 and network E 110. Each of one or more packet filtering devices may be associated with a security policy management server.

The packet filtering device 112 may be configured to receive a security policy from the security policy management server, receive packets associated with a network protected by the packet filtering device, and perform a packet transformation function specified by the security policy on the packets. For example, each of packet filtering devices 112, 114, 116, and 118 may be configured to receive a security policy from security policy management server 120. Each of packet filtering devices 112, 114, 116, and 118 may also be configured to receive packets respectively associated with networks A-D 102, 104, 106, and 108. Each of packet filtering devices 112, 114, 116, and 118 may further be configured to perform one of a plurality of packet transformation functions specified by the security policy. One or more security policies may be generated by the packet filtering device or may be received from security policy management server 120 on the packets respectively associated with networks A-D 102, 104, 106, and 108.

The packet filtering device 112 or management server 120 may distribute certificate threat intelligence to other devices protecting the same network or to other devices configured to receive such certificate threat intelligence. The certificate threat intelligence may be in the form of certificate and certificate authority threat indicators of compromise (IoCs) that are associated with scaled risk scores and threat context information. Network devices (e.g., packet filtering devices) may register as subscribers to receive distributed IoCs and risk score data to protect network assets. A network management device, such as management server 120, may provide threat intelligence/IoCs based on certificates and CAs. The management server 120 may provide risk scores associated with certificates and CAs. The management server 120 may provide context information associated with the certificates in the CRL. Associating scaled risk/threat scores with certificate and certificate authority threat indicators gives the enterprise the flexibility needed to ensure that false positives (blocking legitimate traffic) and false negatives (allowing attacks) can be simultaneously minimized.

The packet filtering device 112 or a network security policy management server 120 may store additional threat context information, such as the types of threats associated with each indicator, a provider or providers of the threat intelligence and/or threat indicator, and other information that may be useful for threat analysis. The threat context information may be provided to a cyber analysis system or device, which may be integrated in a packet filtering device or management server. Based on the threat context information, the cyber analysis system may modify a risk score associated with a particular threat indicator. Similarly, certificate context information may be associated with certificate and certificate authority threat indicators. For example, if a certificate has been revoked, certificate context information may indicate the timing of the revocation, may indicate that a certificate was issued by an untrustworthy certificate authority, and may indicate the provider of the certificate threat indicator associated with a revocation. The certificate context information may also be provided to a cyber analysis system or device. Based on the certificate context information, the cyber analysis system may modify a risk score associated with at least one of a certificate and a certificate authority.

The risk score associated with at least one of a certificate and a certificate authority may be determined as a function of fidelity. The fidelity of a certificate authority threat indicator risk may vary. A certificate authority that may have issued some malicious certificates may also have issued many legitimate certificates. Certificate authority risk fidelity may be determined based on a probability or likelihood that a given certificate issued by a certificate authority is used maliciously. The probability/likelihood that a certificate issued by a certificate authority may be used maliciously may, for example, be calculated as a function of the ratio of the number of malicious certificates issued by the certificate authority to the number of all certificates (both legitimate and malicious certificates) issued by the certificate authority. Alternatively, a risk score associated with at least one of a certificate and a certificate authority may be retrieved from an external source.

The packet filtering device 112 may combine risk scores from a plurality of different threats. For example, the packet filtering device may combine risk scores for certificate threat indicators and/or risk scores for certificate authority threat indicators with risk scores for conventional cyber threat intelligence (CTI) indicators (e.g. network addresses) to compute a risk score for the associated SSL/TLS-secured communication. CTI may be assigned a threat risk score associated with each indicator (network addresses in the form of IP addresses, N-tuple, FQDN, URI), which may be used to compute a risk score for a communication that matches the CTI. For SSL/TLS-secured communications, a certificate threat indicator and certificate authority threat indicator may be similarly assigned risk scores. For a given SSL/TLS-secured communication, the overall risk for the communication may be calculated based on a combination of the packet cyber threat intelligence threat indicators' risk score(s) (if any) and the certificate and certificate authority threat indicators' risk scores (if any).

Certificate data may be collected and distributed by the Certificate Data Collector (CDC) 140 (FIG. 1), as discussed in detail below. Alternatively, the functions of the certificate data collector may be integrated into the server 120 or each of the packet filtering devices 112-118. The CDC 140 may communicate with certificate authorities and threat information providers, and may also collect data for each end user 150A-E (hereafter generally referred to as end user 150) interacting with the protected network environment 100. The CDC 140 may obtain certificate revocation lists, risky domains and their associated certificates, and may collect association information between certificates, certificate authorities, and end users 150.

Figure 2:
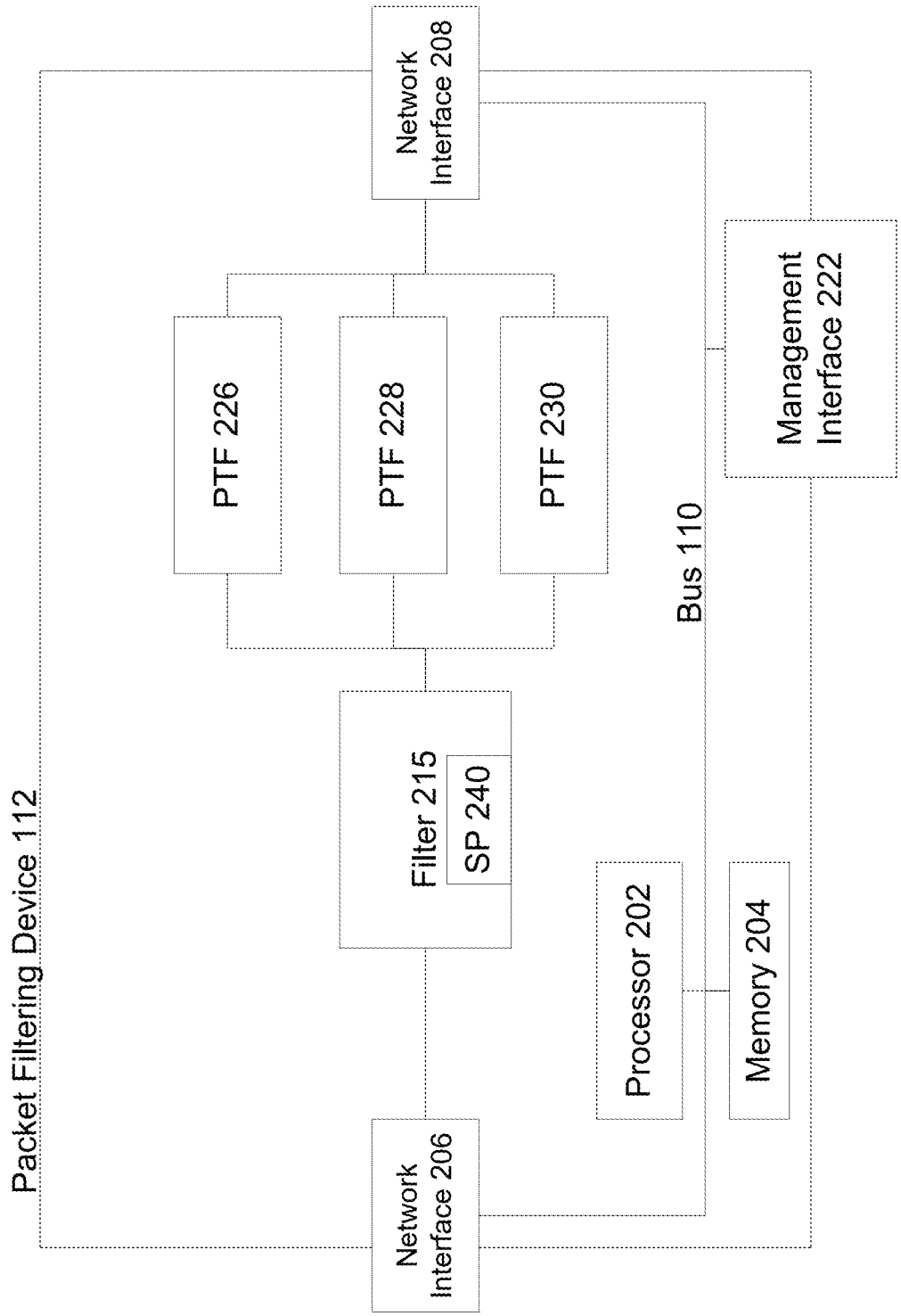
FIG. 2 illustrates an exemplary packet filtering device.

FIG. 2 illustrates an exemplary packet filtering device according to one or more aspects of the disclosure. Referring to FIG. 2, as indicated above, packet filtering device 112 may be located at network boundary 200 between network A 102 and network E 110. Packet filtering device 112 may include processor 202, memory 204, network interfaces 206 and 208, packet filter 215, and management interface 222. Processor 202, memory 204, network interfaces 206 and 208, packet filtering device 212, and management interface 222 may be interconnected via data bus 210. Network interface 206 may connect packet filtering device 112 to network E 110. Similarly, network interface 208 may connect packet filtering device 112 to network A 102. Memory 204 may include one or more program modules that when executed by processor 202, configure packet filtering device 112 to perform various functions as described herein.

Packet filtering device 112 may be configured to receive a security policy from security policy management server 120. For example, packet filtering device 112 may receive security policy 212 from security policy management server 120 via management interface 222 (i.e., out-of-band signaling) or network interface 206 (i.e., in-band signaling). Packet filtering device 112 may include one or more packet filters, or logic for implementing one or more packet filters. For example, packet filtering device 112 may include filter 215, which may be configured to examine information associated with packets received by packet filtering device 112 and forward the packets to one or more packet transformation functions based on the examined information. For example, packet filter 215 may examine information associated with packets received by packet filtering device 112 (e.g., packets received from network E 110 via management interface 222 or network interface 206) and forward the packets to one or more of packet transformation functions 1-N (FIGS. 2, 226, 228, and 230) based on the examined information.

In some embodiments, packet filter 215 may be configured in a network layer transparent manner. For example, packet filtering device 112 may be configured to utilize one or more of network interfaces 206 and 208 to send and receive traffic at the link layer. One or more of network interfaces 206 and 208 may not be addressed at the network layer. By operating in a network layer transparent manner, packet filtering device 112 may insulate itself from network attacks (e.g., DDOS attacks) launched at the network layer because attack packets cannot be routed to the network interfaces 206 and 208. In some embodiments, packet filtering device 112 may include management interface 222, which may be addressed at the network level in order to provide packet filtering device 112 with network level addressability. Access to management interface 222 may be secured, for example, at the application level by using a service such as SSH, or secured at the transport level using, e.g., TLS, or secured at the network level by attaching it to a network with a separate address space and routing policy from network A 102 and network E 110, or secured at the link level, e.g., using the IEEE 802.1X mechanism, etc. Management interface 222 may be coupled to the security policy management server 120.

The packet filtering device 112 may apply at least one of a plurality of different packet transformation functions (e.g., block, allow, log, redirect, capture, etc.), or dispositions, to packets. The packet filtering device may determine which function(s) to apply to the packet based on risk scores associated with the packet. For example, an indicator with a low-risk or high-trust score may cause a matching packet to be allowed to proceed to its intended destination. An indicator with a medium-risk or medium-trust score may cause a matching packet to be allowed-and-logged. An indicator with a high-risk/low-trust score may cause a matching packet to be blocked. For each received packet, the packet filtering device may determine a risk score associated with the packet. The risk score associated with the packet may be determined based on at least a certificate or certificate authority associated with the packet. Based on the determined risk score, the packet filtering device may determine a function to be applied to the packet. The packet filtering device may process the packet based on the determined function to be applied to the packet.

The packet filtering device 112 may generate a message alerting the end user 150 (FIG. 1) that the certificate authority that signed a certificate (which the endpoint intends to use to secure a session via, e.g., TLS) has been determined to have a non-zero risk score. The packet filtering device 112 may cause an alert to be presented by a web browser of an end user 150, or determine that a such an alert has been generated by a web browser. The packet filtering device or web browser may cause the end user 150 to select an option to proceed or terminate the session. The packet filtering device 112 may determine an end user response to a message or alert. For example, the packet filtering device 112 may determine an end user response, based on communications received by the packet filtering device 112 from an end user, after a web browser alert indicating a threat to the end user. The end user 150 may be presented with the risk score associated with the certificate and an explanation of the risk score. End user responses may be logged packet filtering device 112, management server 120, or CDC 140. Each packet filtering device may transmit end user data to a central location such that end user actions determined by different packet filtering devices are gathered and collectively analyzed.

The packet filtering device 112 or CDC 140 may collect statistics on end-point actions, determine a risk score for an end user 150, and report a risky behavior to the endpoint, packet filtering device and/or to a system administrator. For example, an end user choice to allow SSL/TLS tunnels to be set up when the certificate associated with a communication tunnel cannot be validated may be considered a high-risk behavior. In addition, an end user 150 may be presented an indication that a certificate's risk score was determined to be high. If the end user 150 chooses to proceed with the communication associated with the risky certificate or risky certificate authority, the packet filtering device 112 or CDC 140 may take remedial action to improve cybersecurity. For example, the packet filtering device 112 or CDC 140 may increase a risk score associated with the end user.

A packet filtering device 112 may monitor each user or endpoint device for actions associated with each end user 150. Those actions may be logged in order to develop a model of user or endpoint behavior. The packet filtering device may determine a risk score to be associated with a user or endpoint based on the monitored behavior. For example, the packet filtering device may detect when the user or endpoint ignores certificate non-validation warnings. That is, when use of an invalid or revoked certificate is detected, the user or endpoint may be presented with a display warning that allows the user or endpoint to choose to proceed despite the risk or to abandon the associated network request. When a user or endpoint chooses to proceed with a session despite a warning, the packet filtering device may log the event as risky behavior and may increase a risk score associated with the user or endpoint. The packet filtering device may collect data and calculate statistics associated with risky behavior on a per user or per endpoint basis. Based on the data and/or statistics, the packet filtering device may generate user or endpoint threat intelligence. Each user or endpoint's behavior may be scored and reported to cybersecurity administrators.

Based on the reported behavior, a management system or analysis system may take remedial action to mitigate the cybersecurity risk associated with the user or endpoint. For example, the risk score associated with a user or endpoint may be increased, and based on the risk score associated with a user or endpoint, the user may not be given the option to proceed. Furthermore, the packet filtering device may dynamically create and enforce rules that, for example, may block users from proceeding with HTTPS sessions for which the certificates cannot be validated. For example, if the user or endpoint's risk score is above a risk threshold, the packet filtering device may block packets/sessions associated with the user or endpoint. The endpoint risk threshold may be determined by, for example, cybersecurity administrators, and may be dynamically adjusted based on detected actions determined to be risky or risk averse.

The path illustrated by FIG. 2 are merely exemplary and show packets that originate within a network distinct from network A 102 and are destined for a host within network A 102 in order to simplify the illustration. Packet filtering device 112 may be configured to receive and filter packets that originate within a network other than network A 102 (e.g., networks B-E 104, 106, 108, or 110) and are destined for a host within network A 102, as well as packets that originate within network A 102 destined for a network distinct from network A 102 (e.g., network B-D 104, 106, 108, or 110). That is, packet filtering device 112 may be configured to filter and perform one or more packet transformation functions on packets flowing in either direction and may thus be utilized, for example, to both protect network A 102 from malicious network traffic and to prevent malicious network traffic from leaving network A 102.

A security policy (SP) 240 may include one or more rules and may be dynamically updated to reflect new rules generated to address new threats. The configuration of packet filtering device 112 may be based on one or more of the rules included in security policy 240. For example, security policy 240 may include one or more rules specifying that packets having specified information should be forwarded to packet transformation function 226, while all other packets should be forwarded to packet transformation function 228. Packet transformation functions 1-N (FIGS. 2, 226, 228, and 230) may be configured to perform one or more functions on packets they receive from packet filter 215. For example, packet transformation functions 1-N may be configured to forward packets received from packet filter 215 into network A 102, forward packets received from packet filter 215 to an IPsec stack having an IPsec security association corresponding to the packets, or drop packets received from packet filter 215. In some embodiments, one or more of packet transformation functions 1-N may be configured to drop packets by sending the packets to a local "infinite sink" (e.g., the/dev/null device file in a UNIX/LINUX system).

By moving certificate, certificate authority and end user-related cybersecurity functionality from endpoint browsers to network gateways at the network's security perimeter, then the effectiveness, quality, and value of this form of cybersecurity can be significantly increased. In FIG. 2, a packet filtering device 112 may filter SSL/TLS tunnels (e.g., HTTPS sessions) that may use a plurality of types of threat intelligence/threat indicators. The packet filtering device 112 may receive threat intelligence from a plurality of sources. The packet filtering device 112 may receive rules generated by the security policy management server.

A security policy 240 may include rules that may filter packets based on IP addresses/5-tuples, domain names/FQDNs, and URIs associated with the packets, on a packet-by-packet basis. The rules may also filter packets or connections based on certificates, certificate authorities (CAs), and end-users, as discussed in detail below. The rules may be applied by packet filtering devices 112 that are provisioned inline, such that the rules are applied in real time.

Figure 3:
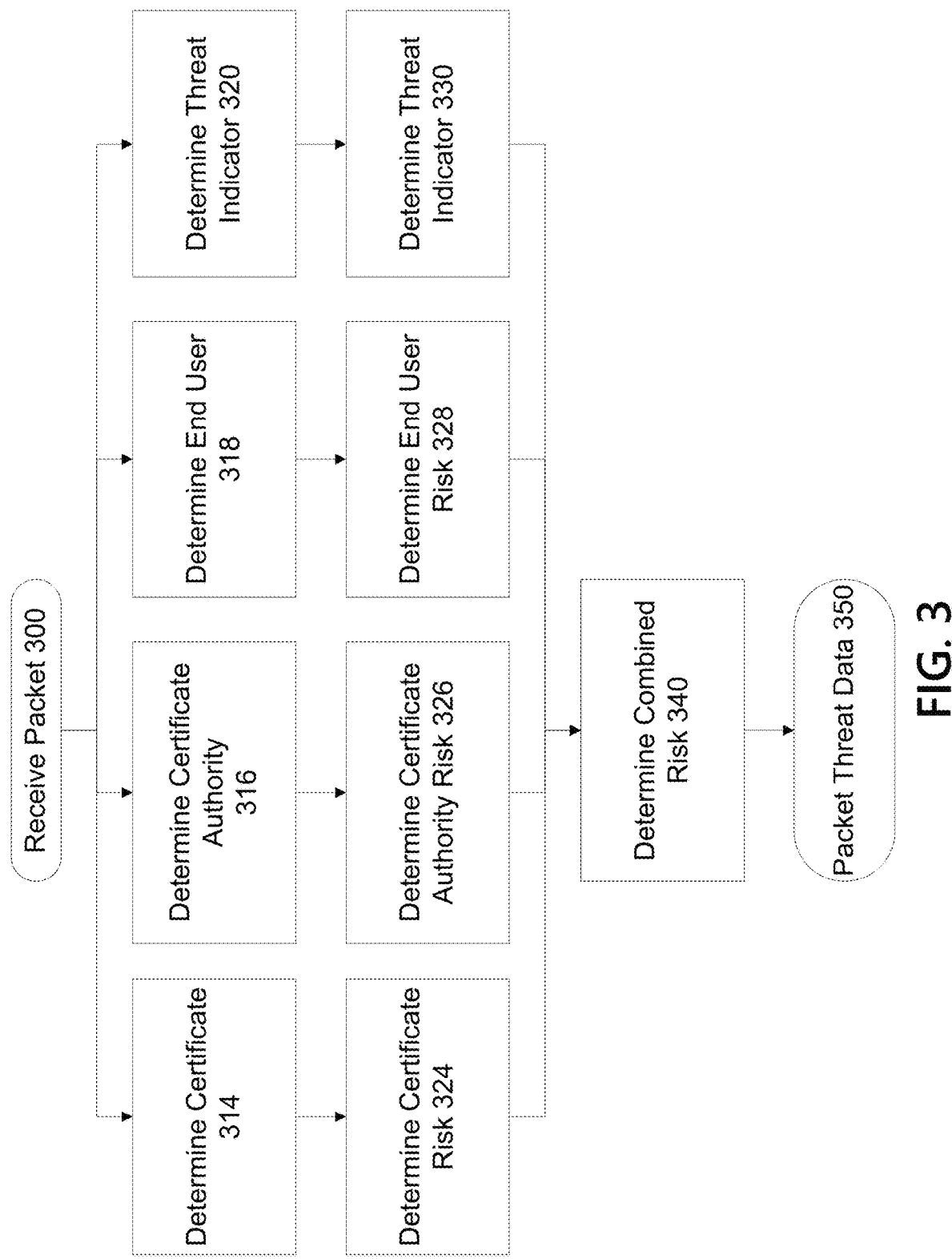
FIG. 3 illustrates an exemplary flowchart for determining packet filtering data associated with a packet for secured communications.

As shown in FIG. 3, a packet filtering device 112 may filter packets based on associated certificates, certificate authorities (CAs), and end-users. Certificates and certificate authorities may be determined based on packet information, including data presented in ClientHello messages. In step 300, the packet filtering device 112 may receive a packet. Based on a spectrum of risks associated with these indicators, a spectrum of actions may be applied to each packet. These actions may include allowing the packet to continue to its intended destination, preventing the packet from continuing to its intended destination, logging the packet, or forwarding the packet to a destination other than its intended destination.

To address this spectrum of risks, certificate threat indicators, certificate authority threat indicators, and other threat indicators may be scored to determine a total threat associated with a packet. The packet filtering device 112 may determine a scaled threat risk score and a scaled trust risk score for each packet, and process each packet based on its determined scaled threat risk and/or scaled trust risk. The packet filtering device may associate each threat indicator with a scaled risk score. Each packet may be associated with a plurality of threat indicator types (e.g. an IP threat indicator, a FQDN threat indicator, a URI threat indicator, etc.). Each of the threat indicator types may have an associated risk score. A combined threat risk score may be determined based on the risk score associated with each threat indicator type associated with the packet.

In step 314, the packet filtering device 112 may determine a certificate associated with the packet and, in step 324, may determine threat data, which may include a risk score, for the certificate associated with the packet. In step 316, the packet filtering device 112 may determine a certificate authority associated with the packet and, in step 326, may determine threat data, which may include a risk score, for the certificate authority associated with the packet. The certificate determinations of steps 314 and 324 and certificate authority determinations of steps 316 and 326 may be repeated for each certificate in the chain of trust.

In step 318, the packet filtering device 112 may determine an end user 150 associated with the packet and, in step 328, may determine end user risk data, which may include a risk score, for the end user associated with the packet. The end user associated with the packet may include a packet source and an intended destination of the packet. In step 320, the packet filtering device 112 may determine threat indicators associated with the packet and, in step 330, may determine threat indicator data, which may include a threat indicator risk score, for the threat indicators associated with the packet.

In step 340, the determined threat data and/or risk score data may be combined to determine combined risk and threat score data associated with the certificate, certificate authority and end user associated with the packet. The packet filtering device may determine a combined threat score for each packet based on at least two of the scaled threat indicator risk score, a scaled certificate risk score, a scaled certificate authority risk score, and a scaled end user risk score. In step 350, the threat data or combined threat data may be used by the packet filtering device to determine either rules to be applied to the packet or whether the packet should be filtered based on a risk score data associated with the packet.

Certificates may be used to establish and secure SSL/TLS tunnels. Certificate authorities, which are organizations that issue certificates, may include a plurality of independent companies, including companies like Symantec, Comodo, and GoDaddy. In addition, an end user identifier, which may be associated with a particular user and/or a particular machine, may be used to filter packets associated with that end user identifier. The end user identifier may be assigned a risk score based on the type and frequency of risks taken by a user(s) associated with the end users identifier. For example, operating Internet applications without using SSL/TLS-secured communications may increase the risk score associated with the end user identifier. An end user identifier may be associated with a user or end point certificate that is issued by a certificate authority to the end user, and a risk score associated with the end user identifier may be increased based on the absence of a user or end point certificate in a SSL/TLS-secured communication.

Certificates may be used by malicious actors. Certificates may be spoofed, and may be used in man-in-the-middle attacks. Certificate authorities and HTTPS servers may be breached and private keys stolen. Malicious actors often encrypt communications that are sent back to a collection device (exfiltrations) to avoid inspection and detection. Such communications may be detected by analyzing the certificates and associated CAs. Furthermore, as the use of encryption increases on the Internet, malicious actors will likely use encrypted communications (e.g. HTTPS) as a default because non-encrypted communications (e.g. HTTP) would be flagged as suspicious/risky by the security-conscious enterprise. In addition, social engineering of end users' behaviors regarding HTTPS communications may be exploited by attackers.

SSL/TLS certificate filtering may be provided based on the determination that not all CAs are trustworthy. It may be that no CA is completely trustworthy, in that the CA may have at least once issued a certificate to a malicious actor. However, certain CAs may be determined to place a premium on vetting their customers to avoid issuing certificates to malicious actors, whereas others will more liberally issue certificates for fees. Some CAs will provide certificates to anyone who will pay their fees, including known malicious actors. In addition, some malicious actors may self-sign their server certificates, and/or sign their certificates with "shell" CAs, and/or obtain certificates for free from open CAs, such as the "Let's Encrypt!" certificate service hosted by the Electronic Frontier Foundation. Some CAs may cautiously vet their customers in order to avoid providing certificates to malicious actors (which would sully the CAs' reputations, a potential business killer for the CA).

Social engineering is, has been, and will continue to be a primary attack vector for malicious actors. Furthermore, some CAs are breached by attackers who may steal the private keys used to sign certificates, and therefore can fake/spoof certificates at will. Given the likelihood of breaches in even the heavily secured enterprises and CAs, and the likelihood that breaches are never discovered or discovered long after their occurrence, we should assume that with some non-insignificant probability, every important CA has been breached, and therefore every certificate issued by important CAs may be compromised. SSL/TLS certificate filtering may be based on a scaled risk score. The threat risk of certificates, certificates authorities, and/or end users may be calculated and may be scored on a threat risk scale. For example, certificates may be evaluated and assigned a score between 0 and 100.

Figure 4:
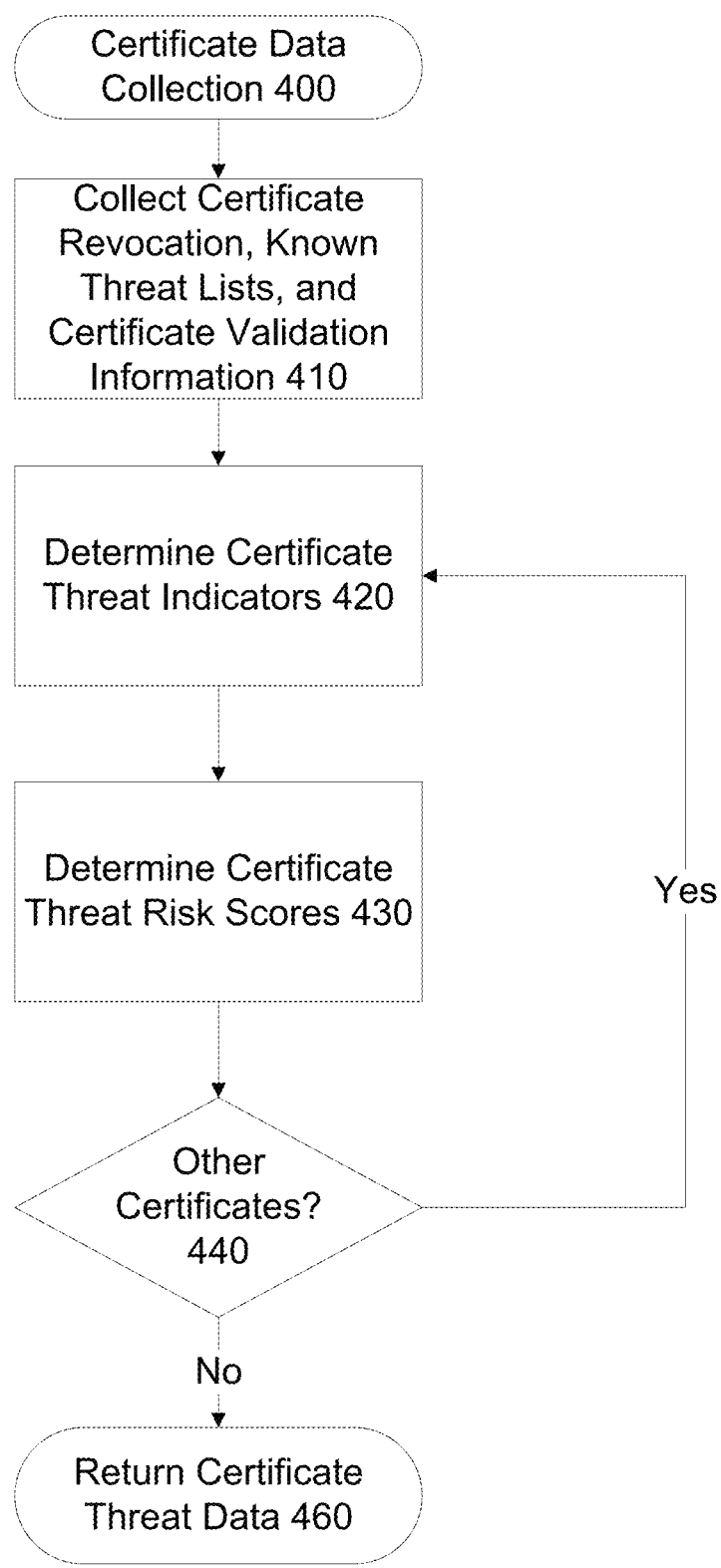
FIG. 4 illustrates an exemplary flowchart for determining certificate data for use in filtering packets.

A packet filtering device 112 may filter a packet in-transit at frame or packet level (e.g. instead of at L7 as a proxy endpoint) based on certificate data without acting as a proxy for the connection (intermediary endpoint). The packet filtering device 112 may quickly search through locally stored information for certificate revocation status data, and may conduct this search without a query for revocation status. This approach is efficient, fast, scales, and minimizes latency. As shown in FIG. 4, a packet filtering device 112 may, based on a certificate data determined for a packet, determine how a packet is to be processed. Some examples of high-risk certificates may include: a certificate presented by a known malicious web/HTTPS server; a certificate that is on a CA's Certificate Revocation List (CRL); a certificate that cannot be validated or has some associated detectable anomaly, such as an exceeded expiration date, a mismatch between the associated server's domain name and the domain name specified in a TLS handshake message, or a faked/non-verifiable digital signature/fingerprint. CAs may revoke certificates for a variety of reasons, including if they believe private keys to generate the certificates may have been compromised/stolen. CAs may publish lists of certificates that they have revoked, called a Certificate Revocation Lists (CRL).

A revoked certificate functions and appears as a valid certificate. In general, it is up to users, web browsers, or proxy elements to determine if a presented certificate has been revoked. However, that certificate checking requires that browsers enable revocation checking via Online Certificate Status Protocol (OCSP) or maintain updated CRLs by querying CAs or local caches. For a cybersecurity-diligent enterprise, this is a difficult policy to enforce. To avoid such issues, a network security system may include the Certificate Data Collector (CDC) 140 (FIG. 1) to generate network threat intelligence and network trust intelligence. A packet filtering device 112 or CDC 140 may collect the Certificate Revocation Lists (CRLs) from a plurality of certificate authorities. The CRLs may be aggregated by the CDC 140. The aggregated CRLs may be distributed to each packet filtering device 112.

The CDC 140 or packet filtering device 112 or security policy management server 120 may be configured to collect the CRLs from CAs and other external sources, as shown in FIG. 4. The CRLs may be retrieved, in step 410, and the CRLs may be retrieved periodically to ensure that the lists are up to date. In addition, the CDC 140, in step 410, may collect data regarding known threats, such as known malicious servers or servers associated with known attacks. That data may include information indicating servers or ports associated with known threats.

As part of the certificate data collection, in step 410, each packet filtering device 112 or the CDC 140 may be configured to validate each server certificate that passes through the packet filtering device. Each packet filtering device 112 or the CDC 140 may be configured to validate each certificate authority's certificate in the chain of trust associated with each server certificate. This certificate validation may occur independent of any threat intelligence associated with a server certificate or signing certificate authority.

Certificate validation checks may include checking to determine if an expiration date associated with a certificate has been exceeded. The certificate validation checks may include other checks for dates which are too far out to have been properly issued or other checks to determine possible tampering with the certificate dating. The certificate validation checks may check for certificate revocation, based on certificate revocation lists or other determinations regarding certificate revocation. The certificate validation checks may include checks for self-signed server certificates. That is, self-signed certificates, not associated with known certificate authorities, may be determined to be an indicator of a threat risk.

A CDC 140 or packet filtering device 112 may determine self-signed certificates to be unverifiable and/or unauthenticated (via digital signature). The CDC 140 or packet filtering device 112 may determine self-signed certificates to include an unverifiable certificate authority chain of trust, and the CDC 140 or packet filtering device 112 may determine certificates (not self-signed) to include a self-issued certificate authority in its chain of trust. Such certificates may be determined to include a non-zero threat risk, as are the servers that provided the certificates. As such, the packet filtering device 112 or CDC 140 may create threat indicators associated with self-signed certificates or self-issued certificate authorities, may assign risk scores and threat context information to each self-signed certificate or self-issued certificate authority, and may assign risk scores and threat context information to the issuer of the self-signed certificate or self-issued certificate authority.

The CDC 140 may, in step 420, determine threat indicators and threat filtering rules based on the gathered CRL data. The CRL data may be combined with certificate and CA indicator threat intelligence data. The CDC 140 may translate the certificates identified based on the CRLs into threat indicators. Threat and trust data may be collected at CDC 140 or another threat collection device. For example, the threat and trust data may be collected by each packet filtering device or at a central management server. The data to be collected may include all high-risk domain names and IP address indicators, associated with a threat, which may be supplied by a plurality of threat intelligence providers.

In addition, the CDC 140, in step 420, may collect certificate information from a plurality of end points such as multiple IP addresses and multiple ports. For example, the CDC 140 may send a HTTP(S) GET <default> request to port 443 and/or port 8443, an HTTPS alternate port, of each domain name and IP address targeted for information collection, may send requests to multiple IP addresses associated with each domain name, or may send requests containing different domain names (e.g. in the SNI field of the TLS handshake) associated with each IP address. If there is an HTTPS service attached to the port 443, the responding server will provide the CDC 140 with a certificate for use in securing (tunneled) HTTP communications. The CDC 140 may send such requests to ports associated with known threats. The server certificate may include the name of the certificate authority that issued the certificate. When sending requests to ports associated with known threats, the certificate and certificate authority associated with that port may also be associated, by the CDC 140, with that threat risk and determine a corresponding threat indicator.

When a certificate has been issued to a known threat server, the CDC 140 may, in step 420, determine that the certificate authority should not be considered 100% trustworthy. The CDC 140 may create a certificate authority indicator and assign a risk score to the certificate authority indicator. When the certificate authority indicator is already known, the CDC 140 may adjust the risk score associated with the certificate authority indicator. The certificate authority indicator's risk score may be correlated with the threat risk score of the known threat server. Similarly, the CDC 140 may assign or update a risk score for an associated certificate indicator. The CDC 140 may query ports that are frequently accessed by endpoints protected by the network security system. The CDC 140 may, in step 430, determine risk scores and/or threat context information. The risk scores and/or threat context information may be based on the threat indicators.

The CDC 140 or the packet filtering device 112 may determine a certificate threat risk, for each certificate received. The certificate threat risk may be scored on a scale ranging over a range (e.g. from 0 to 100, with 0 representing no threat risk, and 100 representing a serious attack). Each certificate authority can be similarly characterized with respect to trustworthiness, or trust risk, and assigned a risk score associated with a determined level of trust. The certificate authorities may be determined to have a trust risk, and that risk may be scored. A certificate's threat risk value and/or a CA's threat/trust risk value may be used by the packet filtering device as a decision factor in allowing, halting, monitoring, modifying, or redirecting SSL/TLS session creation. The packet filtering device 112 or another network security device may generate or apply rules that cause the performance of different actions on each packet or packet flow based on the risk associated with the packet or packet flow.

For example, the CDC 140 or the packet filtering device 112 may also apply rules generated from Certificate Revocation Lists (CRLs) in step 410, which are supplied by CAs. Indicators for the revoked certificates may be collected from all CAs; then, filtering rules may be generated from the indicators. A certificate authority name and serial number may uniquely characterize a certificate and is used as the indicator in CRLs and as the indicator in (future) threat intelligence feeds. Any server or website presenting a revoked certificate should be viewed as risky, and a risk score for each server or website may be generated by at least one network security device. The presentation of a revoked certificate may be reported by the packet filtering device to a management server 120 or CDC 140. Based on the presentation of the revoked certificate, new threat intelligence related to the certificate may be generated and distributed to each packet filtering device.

Non-binary threat risk values associated with IP/N-tuple, FQDN and URL indicators may be combined with certificate threat risk and CA trust risk values to generate a combined risk value for each packet. The combined risk value may be used to alert end user 150 to risks and advise end user 150 about risks associated with packets from a particular server or website. For example, a host/server with a low-risk or zero-risk FQDN indicator (according to threat intelligence), but with a high-risk certificate based on a revoked certificate or a certificate signed by an untrustworthy/compromised CA, the combined risk value may indicate a high risk.

The CDC 140 or the packet filtering device 112 may, in step 440, determine if any additional certificates need to be processed. Additional certificates may be discovered from certificate revocation lists, port or server inquiries based on known threats, or certificates received by the CDC 140 for processing by a system analyst or a packet filtering device 112. After each certificate has been determined to be processed, the CDC 140 or the packet filtering device 112 may, in step 440, determine that there are no other certificates. The CDC may also store all generated certificate threat data and certificate threat risk scores in an internal database. The CDC may update that data and may send that data to devices subscribing to certificate information service. The CDC 140 may, in step 460, return certificate threat data to the packet filtering device 112 or a packet filtering process in order filter a packet.

When a (web) server provides a server certificate in a certificate message as part of an SSL/TLS tunnel setup, the server may also provide the certificate of the certificate authority that issued the server certificate (which may also be included in the certificate message). For each certificate authority certificate that may have been signed by a higher certificate authority, the certificate of any higher certificate authorities is also provided by the server in the certificate message. That is, when the CDC 140 receives or requests a certificate, it may receive a plurality of certificates in a chain of trust for the tunnel. Each server certificate's digital signature may be verified using the certificate authority's public key, which may be included with the certificate authority's certificate.

The certificate authority chain of trust may include a root certificate authority, whose certificate is self-signed. All of the certificate authorities in the chain of trust associated with the server certificate presented by a known threat server may be determined to be associated with the known threat server. That is, each of the certificate authorities in the chain of trust may be determined to be responsible, either directly or indirectly, for issuing a certificate to the known threat server. As such, the CDC 140 may determine that each certificate authorities in the chain of trust may have an associated trust risk. These certificate authorities in the chain of trust may be assigned indicators, and each of those indicators may be associated with a risk score based on the threat. Risk scores may be assigned or adjusted accordingly for each certificate authority indicator.

Figure 5:
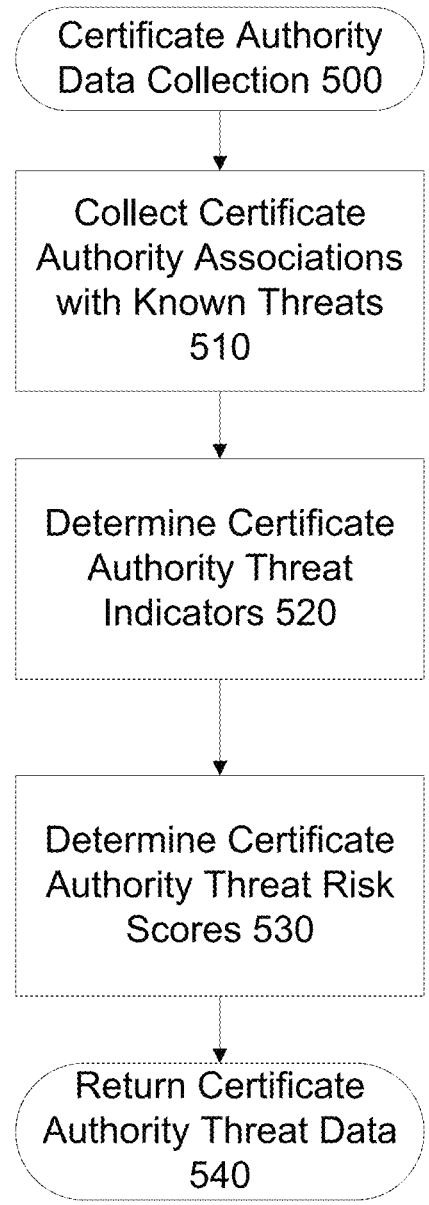
FIG. 5 illustrates an exemplary flowchart for determining certificate authority data for use in filtering packets.

As shown in FIG. 5, the CDC 140 may, in step 500, collect certificate authority intelligence. The certificate authority intelligence may be obtained from commercial, government, open, or publicly available sources, such as systems that identify certificates and certificate authorities that digitally sign malware.

The CDC 140 may, in step 510, correlate revoked certificates still in use with the certificate authorities that issued them. The CDC 140 may collect certificate and certificate authority intelligence data based on certificates issued for other purposes besides SSL/TLS communications. For example, digital signatures of binary code may be authenticated, using certificates issued by certificate authorities, before proceeding with installation and execution of that code. Similarly, in order to be executed, malware may need to have any associated digital signatures verified using certificates issued by certificate authorities.

The CDC 140 may, in step 520, associate certificate authorities issuing certificates used by malware with a degree of trust risk associated with issuing certificates to malware. Information regarding such certificate authorities and associated risk information may be collected from systems that analyze malware and their certificates and certificate authorities. The CDC 140 may gather that data from external systems or may determine associations between malware and certificate authorities by internal methods. For example, the CDC 140 may host a honeypot to attract network attacks or may include a sandbox for executing malware in a manner that protects the safety of other devices.

The CDC 140 or the packet filtering device 112 may, in step 530, determine certificate authority threat risk data for each of the certificate authorities to be processed. After each certificate authority associated with each certificate has been processed, CDC 140 may also store all generated certificate authority threat data and certificate authority threat risk scores in an internal database. The CDC may update that data and may send that data to devices subscribing to a certificate authority information service. The CDC 140 may, in step 540, return certificate authority threat data to the packet filtering device 112 or a packet filtering process, and the certificate authority threat data may be used by receiving devices to filter packets. The CDC may also store all generated certificate authority threat data and certificate authority threat risk scores in an internal database. The CDC may update that data and may send that data to devices subscribing to certificate authority information service.

As an example of packet data associated with a network threat, the Heartbleed bug enabled attackers to steal the servers' private keys as well as users' credentials. A stolen private key may render a server's certificate insecure and may be used to steal HTTPS session keys. However, many administrators were slow to or failed to install security patches, CAs failed to revoke issued certificates, CAs failed to generate or create a new server public/private key pair, and administrators may have failed to obtain a new server certificate from a CA. As such, the risks associated with the Heartbleed bug remained unchanged for many systems. In addition, many Internet HTTPS/web servers are presenting server certificates that have been revoked—and that apparently users/browsers accessing these servers are either ignoring or not even checking the certificates' revocation status, because business continues as usual. This example is indicative of the enormity of the security issues with the Internet public key infrastructure (PKI).

In view of these issues, threat indicators for certificates may have a higher fidelity than threat indicators for CAs. For example, a revoked certificate may be given a score that indicates the certificate is a high-risk threat. However, as certificates should be revoked over time, the threat risk of a revoked certificate does not necessarily correlate well with the trustworthiness of the CA that issued the certificate. As such, the system may independently, or with low correlation, determine threat scores for certificates, certificate authorities, and certificate users.

Figure 6:
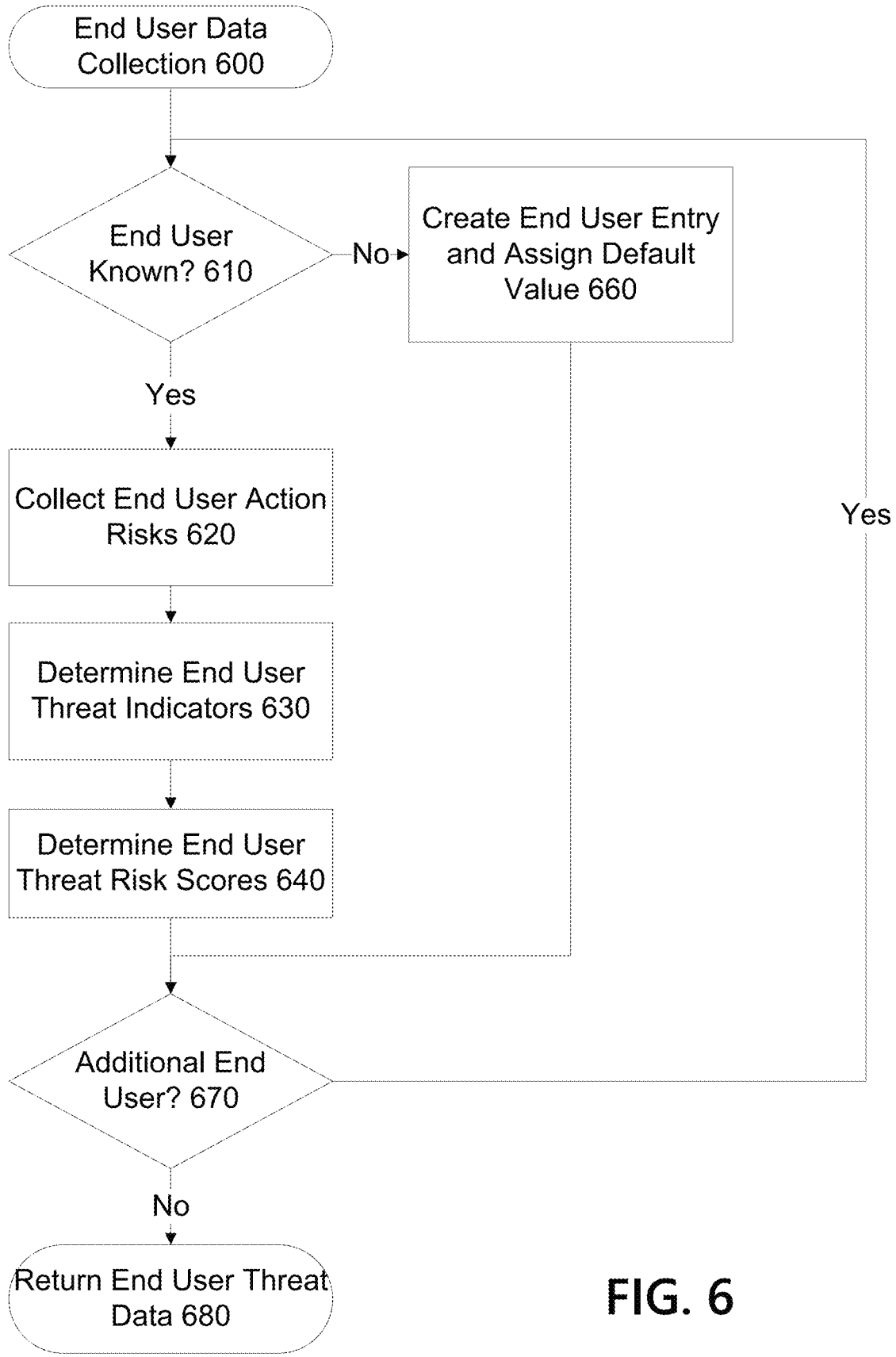
FIG. 6 illustrates an exemplary flowchart for determining end user data for use in filtering packets.

Turning to FIG. 6, a packet filtering device 112, security policy management server 120, or CDC 140 may be configured to collect end user or end user device intelligence. In step 610, the CDC may determine if an end user 150 is known to the system. Identifiers of endpoints associated with HTTPS communications may be determined and identifiers of those endpoints may be stored in a database. Each end user identity may be associated with a particular identifiable user or a particular device.

Based on a packet being filtered or a test process, an end user may be given the option to choose whether to allow a particular packet or communication flow to proceed. As shown in step 620, the network device may receive responses to the requests for end user input, and those responses may be collected by the CDC 140. Those responses may be given based on packets traversing the network or based on network tests designed to determine end user choices. Given the option of proceeding with the HTTPS communications that have been identified as risky, end users often choose to proceed. Additionally, end users may be operating endpoint devices and applications that do not, for example, perform certificate validation checks or revoked certificate checks; thus, the network device may determine that the end user is consciously choosing to engage in risky behavior. Such a determination is valid, however, because the end user has chosen to operate an endpoint device or application that is not properly secured. Based on such risky behavior, the CDC 140 may associate user selections risk data. The CDC 140 may, in step 630, associate end user risks with threat indicators. For example, an end user with a high-risk behavior pattern may be associated with threat indicators that prevent the end user from receiving packets associated with any server located in a known hostile country. Risk behavior data and risk score data may be generated, in step 640, and may be associated with the endpoints that may be stored in the database with the endpoint identifiers. End user threat information may be distributed to a plurality of packet filtering devices.

If an end user 150 is not known to the CDC 140, the CDC 140 may, in step 660, create an end user entry in a user database and may assign the new entry default threat indicators, if necessary, and a default risk score. The CDC 140 may determine, in step 670, if any additional end users 150 need to be processed. The end user data may be transmitted or distributed to each packet filtering device 112.

By providing a packet filtering device, such as a gateway device applying at least one of a plurality of packet filtering rules to at least one packet, with threat indicators based on certificates, CAs, and end users, the packet filtering device may increase security by filtering on the certificates used to set up and secure SSL/TLS tunnels (e.g., HTTPS sessions). This approach may provide enterprise network/cybersecurity administrators a more efficient and effective method for managing certificates' threat risks. That is, instead of allowing all enterprise users to self-manage, which they are known to do poorly, the packet filtering device may enforce associated corporate security policies.

CA and certificate risk intelligence data may be requested and/or received from a CA intelligence provider and/or a certificate risk intelligence provider, such as CDC 140. This CA intelligence data and certificate risk intelligence data may be periodically updated with additional indicators for use in active network defense. These CA and certificate risk intelligence may be combined with other types of threat intelligence to generate new rules for filtering packets.

The filtering rules may include rules for filtering revoked certificates. As websites operating with or invoking revoked certificates are a known threat risk, the risk associated with those sites is increased. The CA statistics of all the IP, FQDN and URI indicators in threat intelligence data may be processed for correlations to determine CA trustworthiness.

For example, certificates presented by known risky sites may be determined to be risky, and those certificates may be added to certificate threat intelligence. In addition, data associated with certificates presented by known risky sites, such as associated IP, FQDN and URI indicators may be compared to threat intelligence data. Certificates associated with a larger number of threats, or threat intelligence data indicating a threat, may be given a higher risk score.

A CA may issue a certificate for other purposes besides SSL/TLS communications. For example, operating systems may authenticate digital signatures of application code before proceeding with installation and execution, or a VPN server may authenticate a remote client's identity with certificates before creating a secure tunnel. The authentication mechanism may use certificates issued by the same CAs that issue certificates for SSL/TLS communications. In order to be executed, malware may need to have associated digital signatures. Those digital signatures may have to be verified as valid using certificates issued by CAs. Thus, the CAs issuing certificates used by known malware may be scored to indicate a high degree of trust risk associated with them. Based on an association with known malware, a high risk score may be associated with the CA and the certificate associated with known malware. CAs and associated risk information may be received from systems that analyze malware and certificates and CAs associated with that malware.

Figure 7:
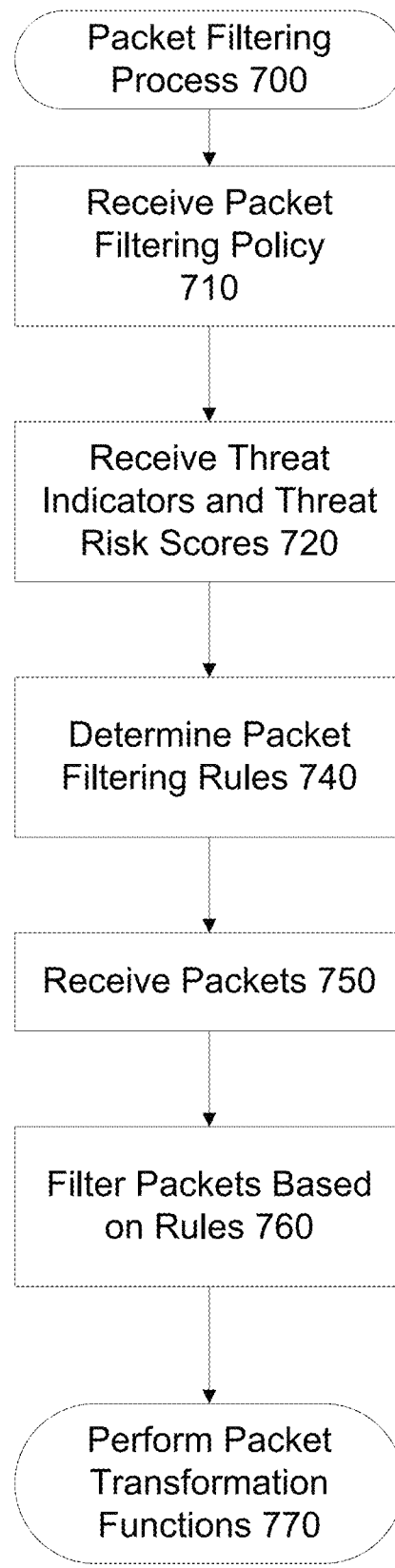
FIG. 7 illustrates an exemplary flowchart for filtering packets.

As shown in FIG. 7. SSL/TLS certificate filtering may be performed by the packet filtering device 112 on packets in-transit in the network. This active certificate filtering may remove additional threats associated with endpoint certificate analysis or browser certificate analysis based on risky user behavior and out-of-date or inadequate software. The packet filtering device 112 may filter a server certificate and any other certificates in the chain of trust contained in a certificate message for FQDN threat indicators and CA threat indicators. The packet filtering device 112 may filter in-transit certificates based on FQDN and CA indicators supplied by threat intelligence services.

A packet filtering device 112 may receive, in step 710, a packet filtering policy that determines how rules are to be generated based on system security preferences. The preferences may be set by a system administrator and may be retrieved from a management server 120. A packet filtering device 112 may receive, in step 720, threat intelligence in the form of certificate and certificate authority threat indicators supplied by one or more threat intelligence providers/services, including the CDC 140. The packet filtering device 112 may determine, in step 740, at least one packet filtering rule. The rules may be determined by applying the packet filtering policy to translate the threat indicators and threat risk scores into packet filtering rules. For example, based on a an acceptable risk setting in the network policy, the packet filtering device 112 may generate packet filtering rules based on threat indicators and risk scores. The policy may dictate that packets associated with a certain level of risk score are associated with a specific operator, such as a block operation or a log and allow operation. The packet filtering device 112 may apply the packet filtering rules to in-transit packets crossing a network boundary (physical or virtual). The packet filtering device may identify packets as components of an SSL/TLS setup/handshake session.

The packet filtering device 112 may receive, in step 750, a plurality of packets in transit in the protected network environment 100. In step 760, the packet filtering device 112 may filter in-transit packets, including tunnel setup messages and/or packets, based on certificate and certificate authority threat indicators. Filtering the packets may include associating a received packet with a prior received packet. A plurality of packets that are associated with the same packet flow may be commonly processed by the packet filtering device 112. Furthermore, all types of indicators of compromise (IoCs), including certificate and certificate authority threat indicators with other types of threat indicators (e.g. network address, IP, domain name, or URI threat indicators) may be aggregated or combined. The threat indicators may be provided from multiple threat intelligence providers or sources, received by each packet filtering device, and the threat indicators from all of those sources may be combined.

Packet filtering rules may be applied to each packet as the packets are in transit. In addition to allowing packets to proceed and blocking packets from proceeding, additional actions may be performed by the packet filtering device, in step 770, based on the packet filtering rules applied to the packet.

Certificate and CA Trustworthiness Measurements and Associated Subscription Service The CDC 140 may be configured to generate and distribute certificate and certificate authority intelligence data. The generated data may be distributed to different networks. Each network or portion of a network may implement network or policy specific packet or certificate filtering rules. The CDC 140 may, in step 800, identify and store the certificate and certificate authority identifiers in a database with associated threat risk values and trust risk values, as well as other threat context data such as associated threat indicators. The CDC 140 may determine and assign threat risk values to certificates and trust risk values to CAs. The CDC 140 may store a list and/or database of subscriber preferences. The CDC 140 may provide a user interface for setting security preferences, which may be set by a system administrator. The subscriber preferences may be used to generate subscriber specific rules. The CDC 140 may generate rules that filter certificates and certificate authorities.

The CDC 140 may determine high risk/low trust values to be associated with hosts/servers that continue to use certificates that have been revoked by the issuing certificate authority. The CDC 140 may increase the risk value of hosts/servers that continue to use certificates that have been revoked based on the length of time the certificate has been revoked. As the length of time the certificate has been revoked increases, the risk associated with that certificate may also increase. In addition, the CDC 140 may determine high risk/low trust values to be associated with the certificate authority that issued the revoked certificate, as the certificate authority has not encouraged or demanded that the host/server use non-revoked certificates. The CDC 140 may determine a certificate authority that is known to have been compromised may have the associated risk scores increased. As the length of time since the certificate authority has been compromised increases, the risk associated with that certificate may decrease.

Figure 8:
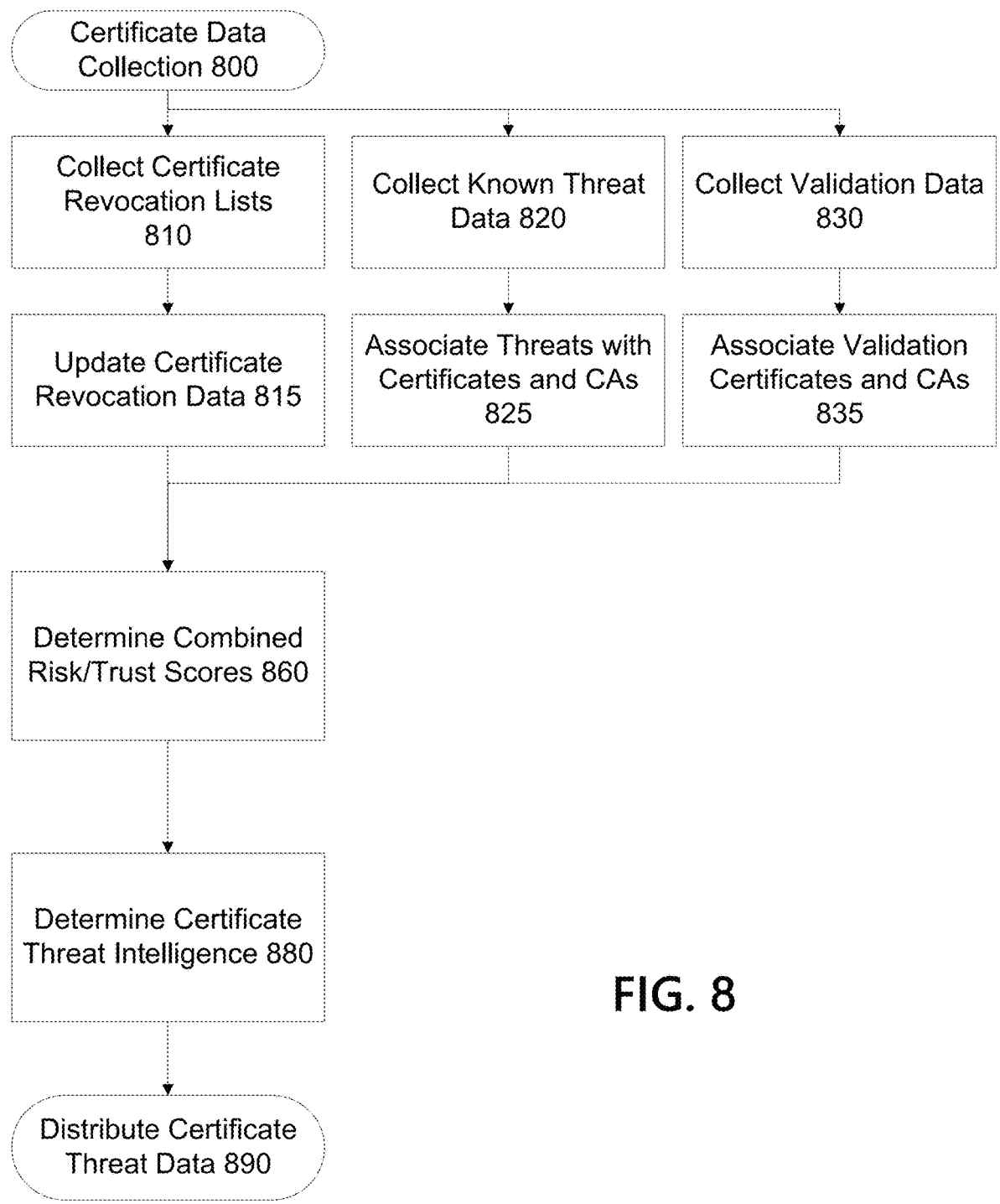
FIG. 8 illustrates an exemplary flowchart for certificate and certificate authority data collection.

Turning to FIG. 8, the CDC 140 may, in step 810, collect CRL data from available sources. The CDC 140 may, in step 815, associate revocation data with particular certificates and certificate authorities. Any certificate determined to be on a CRL may be assigned a high threat risk score or value. Any certificate authority determined to be associated with a certificate on a CRL is not necessarily assigned a high threat risk score or value, as the fidelity of a risk based on a revoked certificate to a certificate authority is relatively low. That is, as certificates are expected to be revoked over time, any risk associated with the issuing certificate authority is not necessarily a high risk. However, if a certificate is determined to be on a CRL, an associated certificate authority may be determined to have a high risk.

The CDC 140 may, in step 820, obtain known threat intelligence data, such as IP/FQDNs/URIs threat indicators, from at least one threat intelligence service. Based on the obtained threat intelligence, the CDC 140 may establish HTTPS sessions with hosts/servers associated with the threat indicators to obtain associated server certificates. The CDC 140 may associate that threat intelligence data with the certificates and CAs based on the established HTTPS sessions. The risk score may be based on the type of associated threat. The known threat data may include policy rules that associate certificates and certificate authorities with risks defined by the rules. For example, some threat indicators may be associated with domain names of hosts/servers that use self-signed server certificates. The CDC 140 may determine a risk associated with any self-signed server certificates, as cyber threat organizations such as the People's Liberation Army (China) have been found to use self-signed server certificates. The CDC 140 may determine or modify a risk score associated with any self-signed server certificate to indicate a high risk. The CDC 140 may determine to associate high risk scores for hosts/servers that use self-signed server certificates. The CDC 140 may determine a high risk/low trust value with the self-signed certificate and a high risk/low trust value with the host/server as a certificate authority.

The CDC 140 may determine high risk/low trust values to be associated with hosts that may use server certificates signed by an intermediate CA that is not trustworthy or is not known to be a legitimate CA. The CDC 140 may determine risk/trust values for each certificate authority in a chain of trust. By independently evaluating each certificate in the chain of trust, the CDC 140 may determine the identity of a "shell" certificate authority set up by malicious actors. In such scenarios, both the intermediate CAs and the hosts should be determined by the CDC 140 to be high-risk. The CDC 140 may determine increased risk score values for server certificates issued by an intermediary certificate authority (e.g. a certificate authority that is not a root certificate authority) relative to the threat risk score values determined for a certificate issued by a root certificate authority. Based on those associations, the CDC 140 may, in step 825 determine or modify a risk score associated with each certificate and certificate authority.

The CDC 140 may, in step 830, collect validation and approved certificate data from approved sources. Root CAs and associated root CA certificates that browser vendors approve may be pre-loaded into browser distributions. As browser vendors generally have a robust vetting process for CAs that want to be included in the preload list, that data may be collected and used to determine trust scores for associated certificate authorities. For example, certificate vetting processes may be provided by outside sources such as Mozilla (Firefox) (process is detailed at wiki.mozilla.org/CA:includedCAs), ETSI (Europe), and WebTrust (North America). The CDC 140 may collect Extended Validation (EV) server certificate data. An Extended Validation (EV) process is used by some CAs to issue EV server certificates. Based on that process, that CDC 140 may determine EV server certificates to be low risk and may determine CAs that issue EV server certificates to be low-risk. The CDC 140 may, in step 835, associate validation data with particular certificates and certificate authorities. Each vetting source may be associated with a confidence value to determine risk values for certificates and certificate authorities. The CDC 140 may assign a relatively high trustworthiness score to certificate authorities included in browser vendor preload lists.

The CDC 140 may, in step 860, determine combined risk/trust scores based on each type of data collected for the certificates and certificate authorities. The CDC 140 may determine or modify a risk score proportional to a level of the threat associated with the certificate and certificate authority. The CDC 140 may determine or modify the risk value within a range of values. The server certificates that should be blocked may be "colored black" and may be assigned the highest threat risk value (e.g. 100 on a scale of 0-100). The server certificates that should be allowed may be "colored white" and may be assigned the lowest threat risk or no threat risk value (e.g. 0 on a scale of 0-100). The server certificates that should be monitored or considered in view of other associated risk may be "colored gray" and may be assigned an intermediate threat risk value (e.g. some value less than 100 but greater than 0 on a scale of 0-100). Similarly, CAs issuing the server certificates may be assigned trust risk values, which may be correlated with the risk values of the IP/FQDN/URI indicators, and which may be correlated with the risk of associated certificates.

The CDC 140 may, in step 880, determine threat intelligence data for use by packet filtering devices and the like. The certificate threat intelligence data may combine risks for a plurality of certificates and certificate authorities into simplified threat intelligence that addresses a plurality of certificates and certificate authorities.

The CDC 140 may, in step 890, distribute risk score values, certificate and certificate authority threat indicators, certificate and certificate authority threat rules and/or certificate and certificate authority filtering policies. The CDC 140 may store a list and/or database of risk values determined for each identified certificate and/or certificate authority. The CDC 140 may store a list and/or database of subscriber devices and/or users that receive information generated by the CDC. The packet filtering device 112 may receive lists of certificates and a certificate authorities that may be considered to be zero or low risk, and may receive lists of certificates and a certificate authorities that may be considered high-risk. The packet filtering device 112 may receive associated rules and/or policies to be enforced by the packet filtering device.

The CDC 140 may provide periodic updates to data distributed to packet filtering devices and end users. The update transmissions may be triggered by threshold amounts of new data or by an interval of time. The CDC 140 may periodically update all data generated and stored in its database, and may update vendor lists of vetted root certificate authorities, and certificate authority's certificates/public keys for decrypting certificates' digital signatures. The CDC 140 may update its certificate revocation list, and may compare updated lists to previously used lists for differencing to generate new certificate and certificate authority data for distribution to subscribers.

Filtering Certificates for Anomalies (aka Validating Certificates)

Figure 9:
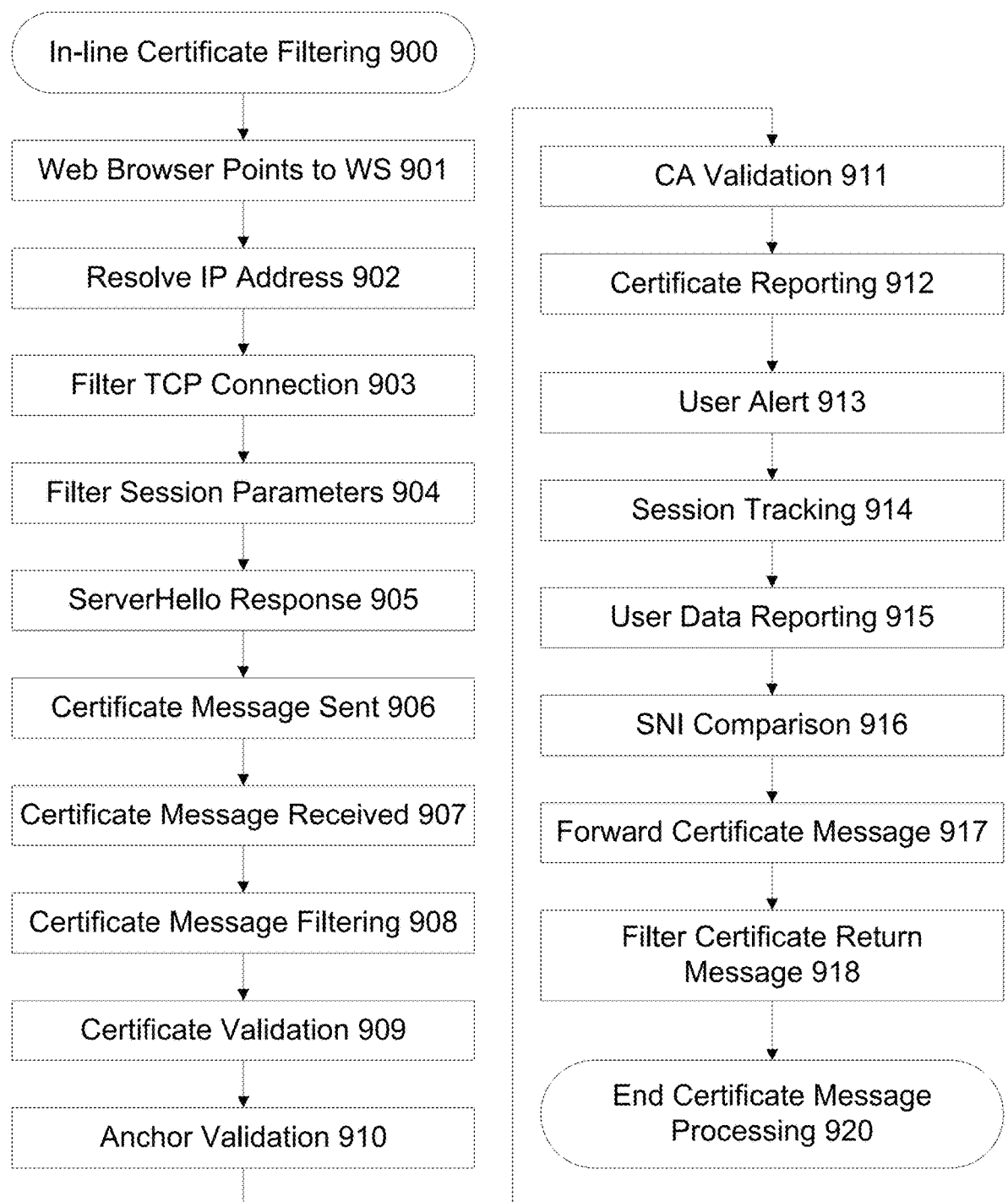
FIG. 9 illustrates an exemplary flowchart for inline certificate filtering.

As depicted in FIG. 9, when a website is requested by an end user 150 within a protected network 100, a packet filtering device 112 may perform inline filtering of certificates based on certificate anomalies and certificate data. Certificate anomalies may include any certificate information issues that prevent the certificate from being validated and/or inconsistencies that are not necessarily encoded in the rules contained in the policy currently being enforced by the packet filtering device. These checks should be applied to all certificates for all SSL/TLS tunnel setup/handshake packets that pass through a packet filtering device 112, regardless of whether or not there are explicit rules in the policy for filtering a given SSL/TLS session and the associated certificates and CAs.

The packet filtering device 112 may verify the certificate's digital signature, may check if a server certificate has expired, may check the revocation status (e.g. by comparing with local or remote CRLs, or invoking Online Certificate Status Protocol (OCSP), or the like), may check if a certificate's Subject: CN (Common Name) value (alternatively, the subjectAltName values) matches the SNI (Server Name Indicator) value extracted from the associated ClientHello message (note that this may require some session state tracking), may check if a server certificate is self-signed (by comparing its Issuer: CN field value to its Subject: CN field value, or alternatively the subjectAltName field values; and/or observing that there is no chain of trust associated with the server certificate), may verify the certificate's chain of trust, and perform any other configured validation procedures. Such checks may be independent of any threat intelligence. Any determination of a certificate anomaly may be logged and reported to a management server 130 or the end user. The checks to be performed by the packet filtering device 112 may be configurable by a policy management application or by a system administrator. For example, the packet filtering device may set the validation process based on global policy rules, configuration files, or a user interface provided to an administrator. Similarly, the packet filtering device 112 may be configured to process packets (e.g., block and log an expired certificate or allow and log an expired certificate) based on any determined certificate anomalies.

A packet filtering device 112, configured to perform inline certificate filtering, may be provisioned into the communication path between a web browser (WB) of an end user 150 and a web server (WS) of a host in an external network (e.g. network A 102). The packet filtering device 112 may store and may enforce a security policy. The security policy may include (a) rules generated from IP, N-tuple, FQDN, and URI indicators supplied by threat intelligence providers, and (b) rules generated from certificate and certificate authority threat intelligence, in the form of certificate indicators and certificate authority indicators. At least a portion of the following steps may be performed in a network including a packet filtering device 112.

In step 901, a user of an end point 150 may point browser WB to a website of an external server (e.g. www.some-web-site.com). In step 902, the WB may resolve (e.g. via a DNS query) the website's domain name to an IP address (e.g. www.some-web-site.com resolves to 1.2.3.4). In step 903, the endpoint WB may establish a TCP connection with port 443 of the website host (e.g. 1.2.3.4 for www.some-web-site.com). The TCP packets used to establish the TCP connection may pass through the packet filtering device 112. The packet filtering device 112 may check if any filtering rule in the policy matches IP address 1.2.3.4. The packet filtering device 112 may check if any filtering rule in the policy matches port and/or protocol data of the packet. If there is no match, the TCP handshake packets may be forwarded without being either blocked or logged.

The WB may send a ClientHello message specifying various session parameters and their associated values. The message may specify the value (e.g. www.some-web-site.com) for the parameter field "SNI: Server Name Indication". The message may specify an IP address that may be used for the SNI value. The packet filtering device 112 may, in step 904, compare a FQDN to the server certificate's Subject field value or subjectAltName field value(s). If the packet filtering device 112 finds comparable values that are not equal, the packet filtering device 112 may determine the existence of a threat.

In the case that the packet filtering device 112's policy includes a rule that allows-and-logs ClientHello packets with matching SNI field values (e.g. www.some-web-site.com), the packet filtering device 112 may locally store the SNI field value and associate it with the current SSL/TLS handshake session in order to later compare the SNI value with the server certificate's Subject value (or subjectAltName values). This process may employ a TLS session tracking agent, which may be embedded within the packet filtering device 112.

In step 905, the WS may respond with a ServerHello message specifying various session parameters. In step 906, the WS may send a certificate message towards WB. The certificate message may include the WS's server certificate as well as any other certificates in the server certificate's chain of trust.

In step 907, the certificate message may be received by and filtered by the packet filtering device 112. Based on the result of the filtering. the certificate message may be transmitted to the client WB. Note that the certificate message may be segmented across multiple IP packets, as IP packets may be limited in size by the maximum transmission unit (MTU) of Ethernet frames, which is often smaller in size than a certificate message. After receiving the certificate message, the packet filtering device 112 may perform multiple types of filtering.

In step 908, the certificate, which may be uniquely characterized by the {Issuer Name, Serial Number} pair, may be filtered by the packet filtering device 112. The certificate filtering may be based on a plurality of rules generated from certificate indicators supplied by intelligence providers. For example, the filtering may be, in part, based on threat indicators for certificates contained in all CRLs published by all CAs. If any matches are found, then the matching rule's disposition (e.g. block and log/alert, allow and log/capture/alert, etc.) may be applied to the packet(s). Also, if a match is found, then the identity (e.g., domain name, and/or IP address) of the WS that supplied the server certificate is recorded. The match may trigger the generation of a message to report packet filtering event data to a threat intelligence collector. The event data may be used by other network devices to generate new network rules or threat indicators. That is, the packet filtering device 112 may function as a threat sensor that causes updates to other packet filtering devices within the protected network.

In step 909, the packet filtering device 112 may perform certificate validation and CA filtering. The packet filtering device 112 may perform a validation process on the WS's server certificate. The validation process may be performed on each certificate in the certification path or the chain of trust provided by the server WS in the Certificate message. The validation process may perform steps in keeping with RFC 5280. The validation process may check the certificate data for incongruities, such as invalid dates, which indicate that the certificate is invalid.

In step 910, the packet filtering device 112 may perform analysis of a trust anchor, which may be a self-signed CA certificate at the beginning/root of the chain of trust. The trust anchor may be compared by the packet filtering device 112 to a set of trusted root CA certificates stored locally by the packet filtering device 112. If a match is not found, then the packet filtering device 112 may report, to a (threat) intelligence collector function such as CDC 140, the entire chain of trust, including WS's server certificate, as well as the identity of WS, and the identity of the endpoint (e.g., the IP address) hosting WB, and appropriate threat context information.

In step 911, the packet filtering device 112 may perform analysis of the certificate authorities in the chain of trust. The packet filtering device 112 may filter the packet based on the CA name (e.g. the certificate's Issuer value) based on the rules generated from CA threat indicators supplied by intelligence providers. If any match is found, then the matching rule's packet disposition (e.g. block and log/capture/alert, allow and log/capture/alert, etc.) may be applied to the associated packet(s). The packet filtering device 112 may apply to the same packet flow or session (e.g. all the packets composing the session).

In step 912, the packet filtering device 112 may determine, based on any validation check matches, if any certificate in the chain of trust fails validation, and then report the event to an intelligence collection element, such as CDC 140. Every entity in a chain of trust associated with the certificate, including the endpoint entities participating in the associated communications, may be associated with some degree of risk. As such, the CDC 140 or another data collection device may receive the validation issue reporting data. As the validation issue data may represent threat intelligence that should be collected, processed, and disseminated, the CDC 140 may collect and log that data, generate certificate threat intelligence based on that data, and distribute the threat intelligence to subscribers (e.g. packet filtering devices, OS instances, etc.). If the server certificate fails validation, then the risk associated with the endpoints (e.g. WS and WB) should be relatively high.

In step 913, if the packet filtering device 112 determined any validation issue or risk issue associated with the certificate message, the packet filtering device 112 may cause the WB to alert a user to the security risk of proceeding with the SSL/TLS session. Alternatively, the packet filtering device 112 may determine user responses to WB generated alerts to the user of a security risk. In step 914, the packet filtering device 112 may track the communication session (e.g. using a local session tracking agent) to capture the WB user's response to the alert. The alert may include risks associated with a certificate and trust associated with certificate authorities. The response may indicate whether or not the user chose to continue with the session despite the presented security risk associated with the session. Even if there are no validation or risk issues, the packet filtering device 112 may track the session in order to gather a complete set of statistics on end-user behavior. The collection of each end user response allows for determination of end-user risk measures, such as the relative frequency of risky sessions vs. safe sessions conducted by the end user. In step 915, the packet filtering device 112 may report the collected user data to the CDC 140, or the like.

In step 916, the packet filtering device 112 may compare the value of the Server Name Indication (SNI) field (if used) of the ClientHello message with the server certificate's Subject field value (alternatively, the subjectAltName field values). The two values should match. If the values are not equal/do not match, the packet filtering device 112 may determine some security risk to be associated with the certificate. The identity of the WB host and WS, as well as the chain of trust, may be reported by the packet filtering device 112 to a threat intelligence collection function such as CDC 140.

In step 917, the packet filtering device 112 may transmit the certificate message sent by the WS to the WB. The WB may perform additional validation checks on the chain of trust. If there is a validation failure, the WB may alert the user to the security issue, and ask the user if the (HTTPS) session should continue. For example, the WB may compare the domain name in the certificate's Subject: CN (Common Name) field (alternatively the subjectAltName field) with the domain name of the web server it originally contacted (this domain name may have been included in the Server Name Indicator (SNI) field of the ClientHello message), and if there is a match, then the WB may proceed with the session. If not, then there may be some malicious activity occurring. If the user opts not to continue, then the WB may signal the termination of the TLS handshake/tunnel setup session by sending an appropriate TLS alert message (e.g., code 0: "Close Notify", or code 40: "Handshake failure") towards the WS (and thus through the packet filtering device 112). If the user opts to continue, then the WB continues with the handshake/tunnel setup session by processing the ServerKeyExchange and ServerHelloDone messages sent by the server WS immediately after having sent the Certificate message, and may send a ClientKeyExchange message to WS, through the packet filtering device 112.

In step 918, the packet filtering device 112 may filter messages sent by the end user 150 WB towards the server WS, and may forward the messages on to WS. The packet filtering device 112 may, locally and asynchronously, process the message from the end user by forwarding a copy of the message to a session tracking agent. The session tracking agent may process the message and determine and log the end user's security/risk behavior. The session tracking agent may create and report intelligence on the user/endpoint behavior. The agent may then send this intelligence to a threat intelligence collector function such as CDC 140. In step 920, the packet filtering device 112 may complete the TLS handshake/tunnel setup session.

Figure 10:
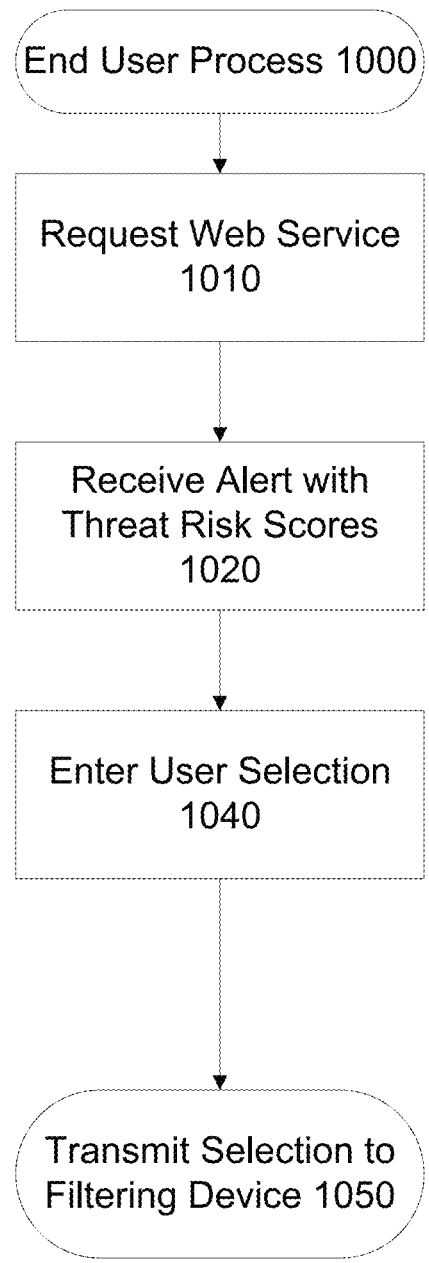
FIG. 10 illustrates an exemplary flowchart for end user processes.

As depicted in FIG. 10, a corresponding end user process 1000 may be implemented only if certificate risks are determined to exist by the packet filtering device 112. In step 1010, the end user may transmit a (HTTPS) web service request to the network. Based on that request, a plurality of packet filtering processes, such as those set forth with regards to FIG. 9 above, may be implemented by the packet filtering device 112. Based on the packet filtering processes, the end user 150 may, in step 1020, receive an alert indicating a risk or risks associated with certificates or certificate authorities related to the packets representing the requested web service. The alert may provide or cause a user interface to be generated and displayed for the end user 150. The end user 150 may, in step 1040, enter a selection indicating that the risk has been acknowledged and indicating whether the user wishes to proceed. The selection may be transmitted, in step 1050, by the end user device to the packet filtering device 112. The packet filtering device 112 may log the user selection and process packets according to the user selection. The selection may also be transmitted to a system management server 120 or CDC 140 to create a log of user actions for use in developing a risk behavior value associated with the user or user end point device.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Figure 11:
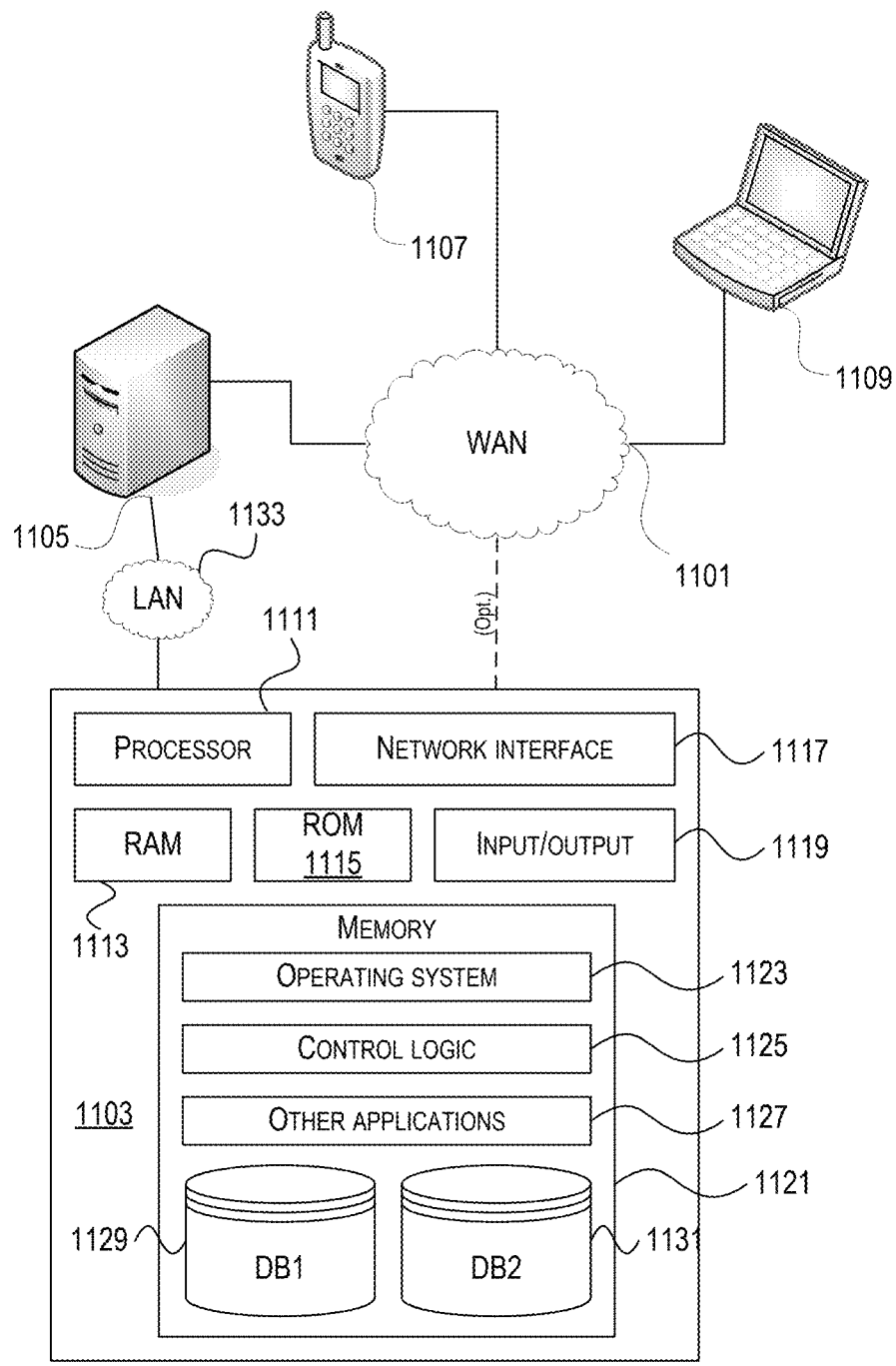
FIG. 11 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 11 illustrates one example of a system architecture and data processing device that may be used to implement one or more illustrative aspects described herein in a standalone and/or networked environment. Various network nodes 1103, 1105, 1107, and 1109 may be interconnected via a wide area network (WAN) 1101, such as the Internet. Other networks may also or alternatively be used, including private intranets, corporate networks, local area networks (LAN), metropolitan area networks (MAN), wireless networks, personal networks (PAN), and the like. Network 1101 is for illustration purposes and may be replaced with fewer or additional computer networks. A local area network 1133 may have one or more of any known LAN topology and may use one or more of a variety of different protocols, such as Ethernet. Devices 1103, 1105, 1107, and 1109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1103, web server 1105, and client computers 1107, 1109. Data server 1103 provides overall access, control and administration of databases and control software for performing one or more illustrative aspects describe herein. Data server 1103 may be connected to web server 1105 through which users interact with and obtain data as requested. Alternatively, data server 1103 may act as a web server itself and be directly connected to the Internet. Data server 1103 may be connected to web server 1105 through the local area network 1133, the wide area network 1101 (e.g., the Internet), via direct or indirect connection, or via some other network. Users may interact with the data server 1103 using remote computers 1107, 1109, e.g., using a web browser to connect to the data server 1103 via one or more externally exposed web sites hosted by web server 1105. Client computers 1107, 1109 may be used in concert with data server 1103 to access data stored therein, or may be used for other purposes. For example, from client device 1107 a user may access web server 1105 using an Internet browser, as is known in the art, or by executing a software application that communicates with web server 1105 and/or data server 1103 over a computer network (such as the Internet).

Servers and applications may be combined on the same physical machines, and retain separate virtual or logical addresses, or may reside on separate physical machines. FIG. 11 illustrates just one example of a network architecture that may be used, and those of skill in the art will appreciate that the specific network architecture and data processing devices used may vary, and are secondary to the functionality that they provide, as further described herein. For example, services provided by web server 1105 and data server 1103 may be combined on a single server.

Each component 1103, 1105, 1107, 1109 may be any type of known computer, server, or data processing device. Data server 1103, e.g., may include a processor 1111 controlling overall operation of the data server 1103. Data server 1103 may further include random access memory (RAM) 1113, read only memory (ROM) 1115, network interface 1117, input/output interfaces 1119 (e.g., keyboard, mouse, display, printer, etc.), and memory 1121. Input/output (I/O) 1119 may include a variety of interface units and drives for reading, writing, displaying, and/or printing data or files. Memory 1121 may further store operating system software 1123 for controlling overall operation of the data processing device 1103, control logic 1125 for instructing data server 1103 to perform aspects described herein, and other application software 1127 providing secondary, support, and/or other functionality which may or might not be used in conjunction with aspects described herein. The control logic may also be referred to herein as the data server software 1125. Functionality of the data server software may refer to operations or decisions made automatically based on rules coded into the control logic, made manually by a user providing input into the system, and/or a combination of automatic processing based on user input (e.g., queries, data updates, etc.).

Memory 1121 may also store data used in performance of one or more aspects described herein, including a first database 1129 and a second database 1131. In some embodiments, the first database may include the second database (e.g., as a separate table, report, etc.). That is, the information can be stored in a single database, or separated into different logical, virtual, or physical databases, depending on system design. Devices 1105, 1107, and 1109 may have similar or different architecture as described with respect to device 1103. Those of skill in the art will appreciate that the functionality of data processing device 1103 (or device 1105, 1107, or 1109) as described herein may be spread across multiple data processing devices, for example, to distribute processing load across multiple computers, to segregate transactions based on geographic location, user access level, quality of service (QOS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 12:
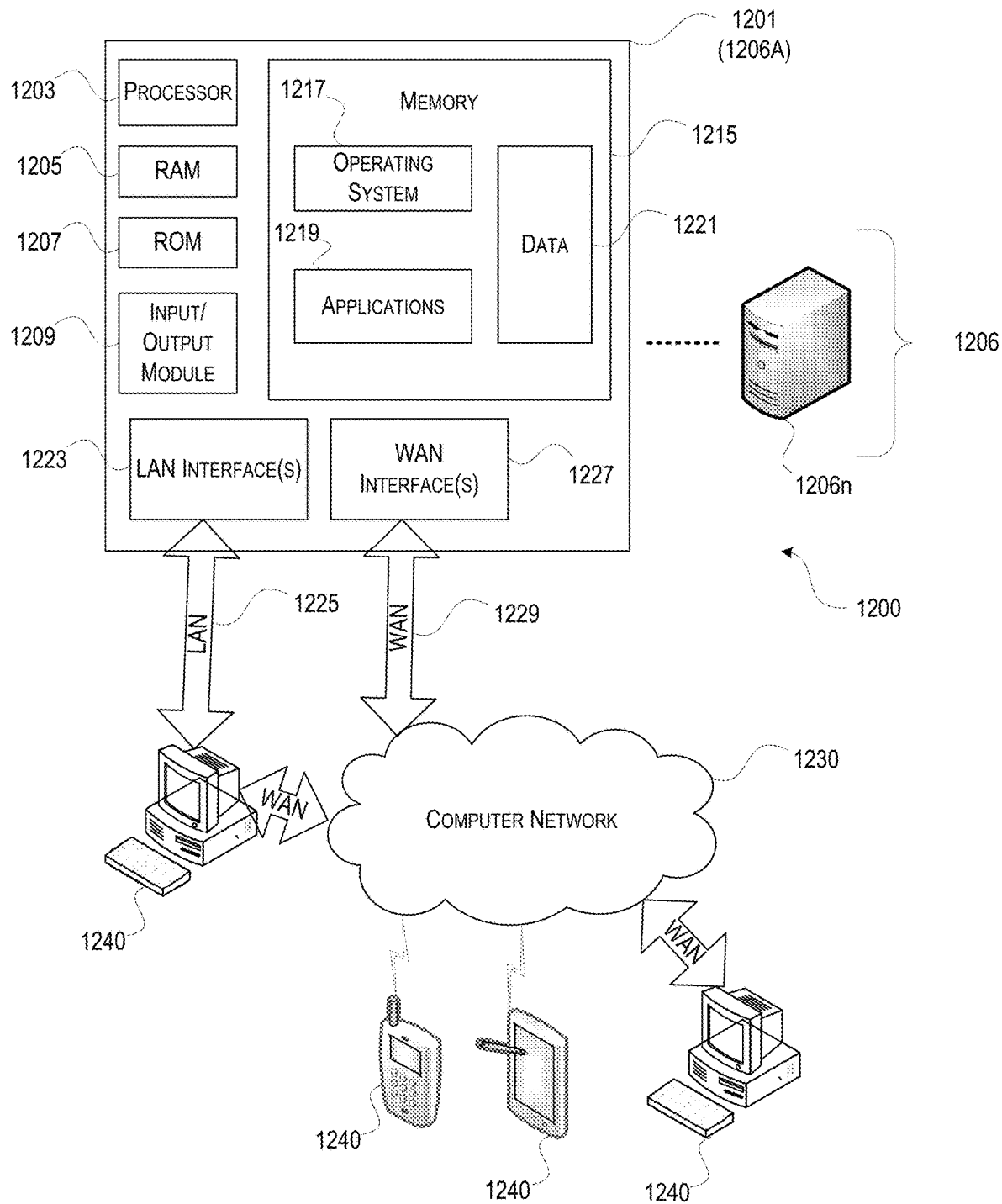
FIG. 12 depicts an illustrative remote-access system architecture that may be used in accordance with one or more illustrative aspects described herein.

With further reference to FIG. 12, one or more aspects described herein may be implemented in a remote-access environment. FIG. 12 depicts an example system architecture including a computing device 1201 in an illustrative computing environment 1200 that may be used according to one or more illustrative aspects described herein. Computing device 1201 may be used as a server 1206a in a single-server or multi-server desktop virtualization system (e.g., a remote access or cloud system) configured to provide virtual machines for client access devices. The computing device 1201 may have a processor 1203 for controlling overall operation of the server and its associated components, including RAM 1205, ROM 1207, Input/Output (I/O) module 1209, and memory 1215.

I/O module 1209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 1215 and/or other storage to provide instructions to processor 1203 for configuring computing device 1201 into a special purpose computing device in order to perform various functions as described herein. For example, memory 1215 may store software used by the computing device 1201, such as an operating system 1217, application programs 1219, and an associated database 1221.

Computing device 1201 may operate in a networked environment supporting connections to one or more remote computers, such as terminals 1240 (also referred to as client devices). The terminals 1240 may be personal computers, mobile devices, laptop computers, tablets, or servers that include many or all of the elements described above with respect to the computing device 1103 or 1201. The network connections depicted in FIG. 12 include a local area network (LAN) 1225 and a wide area network (WAN) 1229, but may also include other networks. When used in a LAN networking environment. computing device 1201 may be connected to the LAN 1225 through a network interface or adapter 1223. When used in a WAN networking environment, computing device 1201 may include a modem 1227 or other wide area network interface for establishing communications over the WAN 1229, such as computer network 1230 (e.g., the Internet). It will be appreciated that the network connections shown are illustrative and other means of establishing a communications link between the computers may be used. Computing device 1201 and/or terminals 1240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 12, one or more client devices 1240 may be in communication with one or more servers 1206a-1206n (generally referred to herein as "server(s) 1206"). In one embodiment, the computing environment 1200 may include a network appliance installed between the server(s) 1206 and client machine(s) 1240. The network appliance may manage client/server connections, and in some cases can load balance client connections amongst a plurality of backend servers 1206.

The client machine(s) 1240 may in some embodiments be referred to as a single client machine 1240 or a single group of client machines 1240, while server(s) 1206 may be referred to as a single server 1206 or a single group of servers 1206. In one embodiment a single client machine 1240 communicates with more than one server 1206, while in another embodiment a single server 1206 communicates with more than one client machine 1240. In yet another embodiment, a single client machine 1240 communicates with a single server 1206.

A client machine 1240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 1206, in some embodiments, may be referenced by any one of the following non-exhaustive terms: server(s), local machine; remote machine; server farm(s), or host computing device(s).

In one embodiment, the client machine 1240 may be a virtual machine. The virtual machine may be any virtual machine, while in some embodiments the virtual machine may be any virtual machine managed by a Type 1 or Type 2 hypervisor, for example, a hypervisor developed by Citrix, IBM, VMware, or any other hypervisor. In some aspects, the virtual machine may be managed by a hypervisor, while in other aspects the virtual machine may be managed by a hypervisor executing on a server 1206 or a hypervisor executing on a client 1240. The virtual machine may also be a container system managed by a container manager, for example Docker and Linux Containers (LXC). The virtual machine may also be a combination of a hypervisor-managed virtual machine and containers.

Some embodiments include a client device 1240 that displays application output generated by an application remotely executing on a server 1206 or other remotely located machine. In these embodiments, the client device 1240 may execute a virtual machine receiver program or application to display the output in an application window. a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 1206, in some embodiments, uses a remote presentation protocol or other program to send data to a thin-client or remote-display application executing on the client to present display output generated by an application executing on the server 1206. The thin-client or remote-display protocol can be a protocol such as the Independent Computing Architecture (ICA) protocol developed by Citrix Systems, Inc. of Ft. Lauderdale, Florida; or the Remote Desktop Protocol (RDP) developed by the Microsoft Corporation of Redmond, Washington.

A remote computing environment may include more than one server 1206a-1206n such that the servers 1206a-1206n are logically grouped together into a server farm 1206, for example, in a cloud computing environment. The server farm 1206 may include servers 1206 that are geographically dispersed while and logically grouped together, or servers 1206 that are located proximate to each other while logically grouped together. Geographically dispersed servers 1206a-1206n within a server farm 1206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 1206 may be administered as a single entity, while in other embodiments the server farm 1206 can include multiple server farms.

In some embodiments, a server farm may include servers 1206 that execute a substantially similar type of operating system platform (e.g., WINDOWS, UNIX, LINUX, IOS, ANDROID, SYMBIAN, etc.) In other embodiments, server farm 1206 may include a first group of one or more servers that execute a first type of operating system platform, and a second group of one or more servers that execute a second type of operating system platform.

Server 1206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 1206a that receives requests from a client machine 1240, forwards the request to a second server 1206b (not shown), and responds to the request generated by the client machine 1240 with a response from the second server 1206b (not shown.) First server 1206a may acquire an enumeration of applications available to the client machine 1240 and well as address information associated with an application server 1206 hosting an application identified within the enumeration of applications. First server 1206a can then present a response to the client's request using a web interface, and communicate directly with the client 1240 to provide the client 1240 with access to an identified application. One or more clients 1240 and/or one or more servers 1206 may transmit data over network 1230, e.g., network 1101.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
receiving, by a certificate data collector and from one or more threat intelligence providers, threat intelligence data associated with a plurality of hosts, wherein the threat intelligence data indicates a first host that has been identified as a potential threat by the one or more threat intelligence providers;
in response to receiving the threat intelligence data, determining, by the certificate data collector, one or more certificate authorities that have issued one or more certificates to the first host;

receiving, by the certificate data collector and from one or more external systems that identify certificates and certificate authorities associated with hosts, certificate authority intelligence information associated with the one or more certificate authorities that were determined to have issued the one or more certificates to the first host;

determining a risk score associated with each certificate authority of the one or more certificate authorities, wherein the risk score associated with a particular certificate authority is determined based on:

the threat intelligence data indicating that the first host has been identified as a potential threat by the one or more threat intelligence providers; and the certificate authority intelligence information associated with the one or more certificate authorities indicating that the particular certificate authority issued a certificate to the first host;

sending, to a client system, the determined risk scores associated with each certificate authority of the one or more certificate authorities;

generating, based on the determined risk scores associated with each certificate authority, one or more packet-filtering rules; and sending, to a packet-filtering device associated with the client system, the one or more packet-filtering rules, wherein the packet-filtering device is configured to apply the one or more packet-filtering rules to network traffic.

2. The method of claim 1, wherein the client system is further configured to generate, based on the determined risk scores associated with each certificate authority, one or more second packet-filtering rules.

3. The method of claim 1, wherein the threat intelligence data comprises at least one of:

a domain name associated with the first host; or an internet protocol (IP) address associated with the first host.

4. The method of claim 1, wherein the one or more certificates form a chain of trust.

5. The method of claim 1, further comprising:

determining a first risk score associated with a first certificate authority based on identifying the first certificate authority as being associated with a cyber threat organization.

6. The method of claim 1, wherein determining the risk score associated with each certificate authority comprises:

assigning, based on one or more threat indicators identified in the threat intelligence data, a risk score to each certificate authority that issued a certificate to the first host.

7. The method of claim 1, further comprising:

determining, based on the threat intelligence data, a second risk score associated with each respective certificate of one or more certificates issued to the first host; and sending, by the certificate data collector and to a packet-filtering device associated with the client system, the second risk score associated with each respective certificate of the one or more certificates issued to the first host, along with the risk scores associated with each certificate authority.

8. The method of claim 7, further comprising:

generating, based on the risk scores associated with each certificate authority and based on the second risk score associated with each respective certificate of the one or more certificates, a packet-filtering rule.

9. The method of claim 1, wherein the risk score associated with the particular certificate authority is further based on at least one of:

a determination of whether the particular certificate authority issued a second certificate to known malware sites;

a determination of whether a second certificate has been revoked; or a determination that the certificate issued to the first host is a self-signed certificate.

10. The method of claim 1, wherein the client system comprises a packet-filtering device that resides at a boundary between, and interfaces with, a protected network and an unprotected network.

11. The method of claim 1, wherein the one or more packet-filtering rules comprise one or more rules configured to:

protect a network associated with the client system from malicious network traffic; or prevent malicious traffic from leaving the network associated with the client system.

12. A certificate data collector comprising:

one or more processors; and memory storing instructions that, when executed by the one or more processors, cause the certificate data collector to:

receive, from one or more threat intelligence providers, threat intelligence data associated with a plurality of hosts, wherein the threat intelligence data indicates a first host that has been identified as a potential threat by the one or more threat intelligence providers;

determine, in response to receiving the threat intelligence data, one or more certificate authorities that have issued one or more certificates to the first host;

receive, from one or more external systems that identify certificates and certificate authorities associated with hosts, certificate authority intelligence information associated with the one or more certificate authorities that were determined to have issued the one or more certificates to the first host;

determine a risk score associated with each certificate authority of the one or more certificate authorities, wherein the risk score associated with a particular certificate authority is determined based on:

the threat intelligence data indicating that the first host has been identified as a potential threat by the one or more threat intelligence providers; and the certificate authority intelligence information associated with the one or more certificate authorities indicating that the particular certificate authority issued a certificate to the first host;

send, to a client system, the determined risk scores associated with each certificate authority of the one or more certificate authorities;

generate, based on the determined risk scores associated with each certificate authority, one or more packet-filtering rules; and send, to a packet-filtering device associated with the client system, the one or more packet-filtering rules, wherein the packet-filtering device is configured to apply the one or more packet-filtering rules to network traffic.

13. The certificate data collector of claim 12, wherein the client system is further configured to generate, based on the determined risk scores associated with each certificate authority, one or more second packet-filtering rules.

14. The certificate data collector of claim 12, wherein the threat intelligence data comprises at least one of:
   a domain name associated with the first host; or
   an internet protocol (IP) address associated with the first host.

15. The certificate data collector of claim 12, wherein the one or more certificates form a chain of trust.

16. The certificate data collector of claim 12, wherein the instructions, when executed by the one or more processors, cause the certificate data collector to determine a first risk score associated with a first certificate authority by identifying the first certificate authority as being associated with a cyber threat organization.

17. The certificate data collector of claim 12, wherein the instructions, when executed by the one or more processors, cause the certificate data collector to determine the risk score associated with the certificate authority by assigning, based on one or more threat indicators identified in the threat intelligence data, a risk score to each certificate authority that issued a certificate to the first host.

18. The certificate data collector of claim 12, wherein the instructions, when executed by the one or more processors, cause the certificate data collector to:
   determine, based on the threat intelligence data, a second risk score associated with each respective certificate of one or more certificates issued to the first host; and
   send, to a packet-filtering device associated with the client system, the second risk score associated with each respective certificate of the one or more certificates issued to the first host along with the risk scores associated with each certificate authority.

19. The certificate data collector of claim 18, wherein the instructions, when executed by the one or more processors, cause the certificate data collector to generate, based on the risk scores associated with each certificate authority and based on the second risk score associated with each respective certificate of the one or more certificates, a packet-filtering rule.

20. The certificate data collector of claim 12, wherein the risk score associated with the particular certificate authority is further based on at least one of:
   a determination of whether the particular certificate authority issued a second certificate to known malware sites;
   a determination of whether a second certificate has been revoked; or
   a determination that the certificate issued to the first host is a self-signed certificate.

21. The certificate data collector of claim 12, wherein the client system comprises a packet-filtering device that resides at a boundary between, and interfaces with, a protected network and an unprotected network.

22. The certificate data collector of claim 12, wherein the one or more packet-filtering rules comprise one or more rules configured to:
   protect a network associated with the client system from malicious network traffic; or
   prevent malicious traffic from leaving the network associated with the client system.

23. A non-transitory computer-readable medium comprising instructions that, when executed, cause a certificate data collector to:
   receive, from one or more threat intelligence providers, threat intelligence data associated with a plurality of hosts, wherein the threat intelligence data indicates a first host that has been identified as a potential threat by the one or more threat intelligence providers;
   determine, in response to receiving the threat intelligence data, one or more certificate authorities that have issued one or more certificates to the first host;
   receive, from one or more external systems that identify certificates and certificate authorities associated with hosts, certificate authority intelligence information associated with the one or more certificate authorities that were determined to have issued the one or more certificates to the first host;
   determine a risk score associated with each certificate authority of the one or more certificate authorities, wherein the risk score associated with a particular certificate authority is determined based on:
      the threat intelligence data indicating that the first host has been identified as a potential threat by the one or more threat intelligence providers; and
      the certificate authority intelligence information associated with the one or more certificate authorities indicating that the particular certificate authority issued a certificate to the first host; and
   send, to a client system, the determined risk scores associated with each certificate authority of the one or more certificate authorities;
   generate, based on the determined risk scores associated with each certificate authority, one or more packet-filtering rules; and
   send, to a packet-filtering device associated with the client system, the one or more packet-filtering rules, wherein the packet-filtering device is configured to apply the one or more packet-filtering rules to network traffic.

24. The non-transitory computer-readable medium of claim 23, wherein the client system is further configured to generate, based on the determined risk scores associated with each certificate authority, one or more second packet-filtering rules.

25. The non-transitory computer-readable medium of claim 23, wherein the threat intelligence data comprises at least one of:
   a domain name associated with the first host; or
   an internet protocol (IP) address associated with the first host.

26. The non-transitory computer-readable medium of claim 23, wherein the one or more certificates form a chain of trust.

27. The non-transitory computer-readable medium of claim 23, wherein the instructions, when executed, cause the certificate data collector to determine a first risk score associated with a first certificate authority by identifying the first certificate authority as being associated with a cyber threat organization.

28. The non-transitory computer-readable medium of claim 23, wherein the instructions, when executed, cause the certificate data collector to determine the risk score associated with each certificate authority by assigning, based on one or more threat indicators identified in the threat intelligence data, a risk score to each certificate authority that issued a certificate to the first host.

29. The non-transitory computer-readable medium of claim 23, wherein the instructions, when executed, cause the certificate data collector to:
   determine, based on the threat intelligence data, a second risk score associated with each respective certificate of the one or more certificates issued to the first host; and
   send, to a packet-filtering device associated with the client system, the second risk score associated with each respective certificate of the one or more certificates issued to the first host along with the risk scores associated with each certificate authority.

30. The non-transitory computer-readable medium of claim 29, wherein the instructions, when executed, cause the certificate data collector to generate, based on the risk scores associated with each certificate authority and based on the second risk score associated with each certificate of the one or more certificates, a packet-filtering rule.

31. The non-transitory computer-readable medium of claim 23, wherein the risk score associated with the particular certificate authority is further based on at least one of:
   a determination of whether the particular certificate authority issued a second certificate to known malware sites;
   a determination of whether a second certificate has been revoked; or
   a determination that the certificate issued to the first host is a self-signed certificate.

32. The non-transitory computer-readable medium of claim 23, wherein the client system comprises a packet-filtering device that resides at a boundary between, and interfaces with, a protected network and an unprotected network.

33. The non-transitory computer-readable medium of claim 23, wherein the one or more packet-filtering rules comprise one or more rules configured to:
   protect a network associated with the client system from malicious network traffic; or
   prevent malicious traffic from leaving the network associated with the client system.

* * * * *